US011860441B2

(12) United States Patent
Levin et al.

(10) Patent No.: US 11,860,441 B2
(45) Date of Patent: Jan. 2, 2024

(54) OPTICAL DEVICE WITH EXPANSION COMPENSATION

(71) Applicant: Unispectral Ltd., Ramat Gan (IL)

(72) Inventors: Peleg Levin, Rishon Le-Zion (IL); Eliahu Chaim Ashkenazi, Jerusalem (IL)

(73) Assignee: UNISPECTRAL LTD., Ramat Gan (IL)

( * ) Notice: Subject to any disclaimer, the term of this patent is extended or adjusted under 35 U.S.C. 154(b) by 0 days.

(21) Appl. No.: 17/056,699

(22) PCT Filed: May 7, 2019

(86) PCT No.: PCT/IB2019/053742
§ 371 (c)(1),
(2) Date: Nov. 18, 2020

(87) PCT Pub. No.: WO2019/220263
PCT Pub. Date: Nov. 21, 2019

(65) Prior Publication Data
US 2021/0208360 A1 Jul. 8, 2021

Related U.S. Application Data

(60) Provisional application No. 62/673,149, filed on May 18, 2018.

(51) Int. Cl.
*G02B 7/02* (2021.01)
*G02B 7/00* (2021.01)

(52) U.S. Cl.
CPC .............. *G02B 7/028* (2013.01); *G02B 7/006* (2013.01); *G02B 7/008* (2013.01)

(58) Field of Classification Search
CPC .............................. H04N 5/00; H04N 5/2254
USPC ....... 359/820, 819, 808, 811, 818, 611, 703, 359/704, 740, 900
See application file for complete search history.

(56) References Cited

U.S. PATENT DOCUMENTS

| 3,601,343 | A | * | 8/1971 | Sivaslian | ................. | G02B 7/18 |
| | | | | | | 248/467 |
| 6,560,045 | B1 | | 5/2003 | Schletterer | | |
| 8,918,724 | B2 | * | 12/2014 | Sitrick | ................. | G06Q 50/20 |
| | | | | | | 715/765 |
| 10,827,152 | B2 | * | 11/2020 | Krylov | ................. | B81B 3/0056 |
| 2015/0277155 | A1 | | 10/2015 | Raviv | | |
| 2016/0303970 | A1 | | 10/2016 | Krier et al. | | |
| 2017/0031126 | A1 | | 2/2017 | Erbe et al. | | |

FOREIGN PATENT DOCUMENTS

| CN | 2669210 Y | 1/2005 |
| CN | 106062604 A | 10/2016 |
| WO | 2005/033755 A2 | 4/2005 |

(Continued)

*Primary Examiner* — Jie Lei
(74) *Attorney, Agent, or Firm* — Whitestone Law, PLLC

(57) ABSTRACT

An optical unit that includes a lens and a frame that is configured to support the lens; wherein the lens has a coefficient of thermal expansion (CTE) of a first value; wherein the frame has a CTE of a second value; wherein the first value differs from the second value; and wherein at least one of the lens and the frame comprises a flexible interface for compensating for differences between thermal expansions of the lens and of the frame.

27 Claims, 25 Drawing Sheets

(56) References Cited

FOREIGN PATENT DOCUMENTS

| WO | 2014/207742 A2 | 12/2014 |
| WO | 2017/009850 A1 | 1/2017 |
| WO | 2018/092104 A1 | 5/2018 |

\* cited by examiner

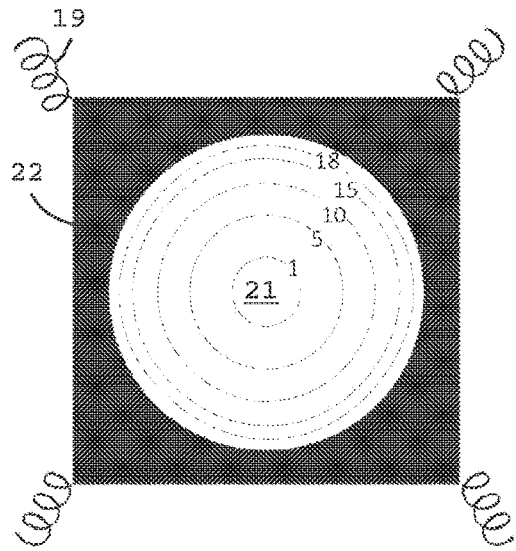 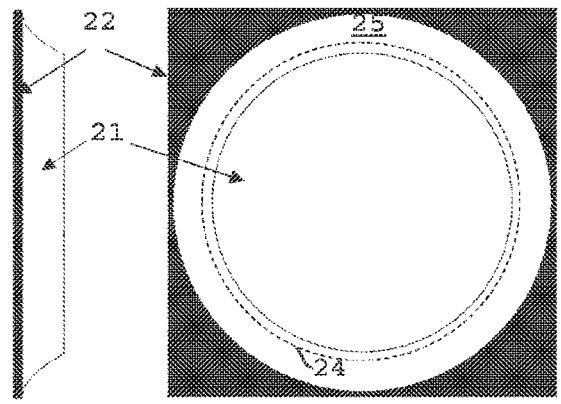
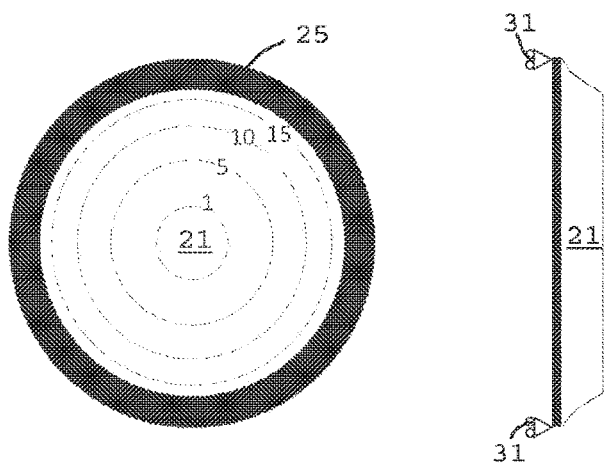
FIG. 1A    FIG. 1B    FIG. 1C
FIG. 2A    FIG. 2B

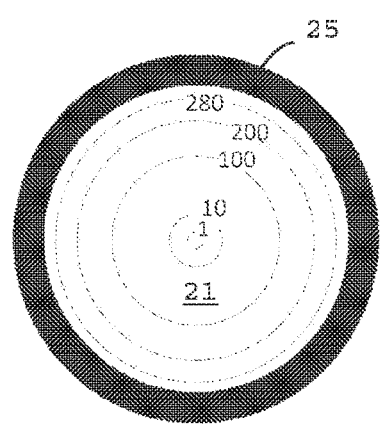
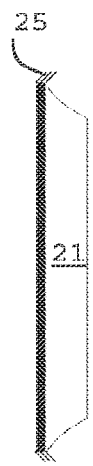
FIG. 2C　　　　　　FIG. 2D
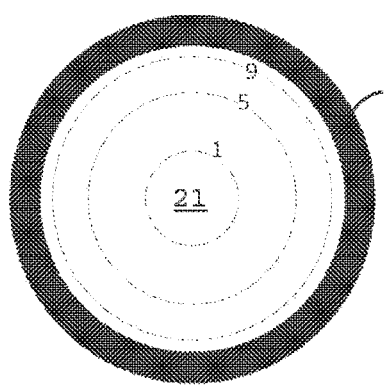
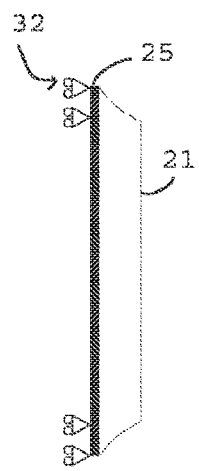
FIG. 2E　　　　　　FIG. 2F

OPTICAL DEVICE WITH EXPANSION COMPENSATION

CROSS REFERENCE

This application claims priority from U.S. provisional patent 62/673,149 filing date May 18, 2018, which is incorporated herein in its entirety.

BACKGROUND

Optical units may include optical components such as a lens, and mechanical components such as a frame. The frame and the lens may differ from each other by their coefficient of thermal expansion values.

For example, over the range 20° C. to 60° C., glass has an average coefficient of thermal expansion (CTE) which is nearly 30% higher than the CTE of a mono silicon frame (approximately 3.36 vs. 2.6 ppm/K).

Thus, a hybrid optical unit may exhibit significant levels of thermal deformation.

Optical units, such as MEMS tunable Fabry-Perrot filters, are extremely sensitive to optical gap variations. Such optical gap variations should be less than a few tens of nanometers within the whole operating temperature range.

There is a growing need to provide an optical unit that may overcome differences in the CTE of its different components.

SUMMARY

There Is provided an optical device and a bonding method, as substantially illustrated in at least one of the specification, claims, and drawings.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals.

FIGS. 1A-1C are examples of at least one optical unit;
FIGS. 2A-2F are examples of at least one optical unit.

DETAILED DESCRIPTION

In the following discussion, the term "glass" is used as a general non-limiting example of an at least partially transparent material. It is noted that the term glass should not be construed as limiting, and other materials are also contemplated, including any material or combination of materials with suitable transparency to light in a required wavelength range for the etalon and the image sensor to function in a desired way, for example plastic, silica, germanium, or silicon (silicon is transparent to wavelengths of roughly 1-8^m).

Any reference to an optical unit should be applied, mutatis mutandis, to a method that is executed by an optical unit and/or to a method for manufacturing the optical unit. The term "and/or" is used to imply "additionally or alternatively".

For simplicity of explanation it is assumed that the frame and the lens have a horizontal longitudinal axis, and the thickness of the frame and the lens are measured along a vertical axis. Any reference to a plane means a reference to a plane that is also horizontal.

It has been found that in an optical device such as a tunable MEMS-etalons device, at least one part of a glass lens may be attached to a silicon frame. In this configuration, at increased temperatures, the glass lens would tend to expand more than the surrounding silicon frame, thus causing significant deformations in the glass lens.

There Is provided an optical unit that may include a lens and a frame that is configured to support the lens. The lens has a CTE of a first value, and the frame has a CTE of a second value. The first value differs from the second value. The optical unit includes a flexible interface for compensating for differences between thermal expansions of the lens and of the frame. The flexible interface may be included in the lens, may be included in the frame, may be included in both the lens and the frame, or may not be included in either one of the lens and the frame.

The flexible interface may include multiple grooves that have at least one microscopic dimension (for example a microscopic width). The term groove may also be referred to as a slot, sift, recess, tunnel, and the like.

FIGS. 1A-1C, 2A-2F, 3A-3B, 4A-4B, 5, 6A-6B, 7A-7C, 8A-8D and 9A-9D are examples of an optical unit.

FIGS. 1A, 2A, 2C, 2E, 3A, 4A, 4B, 5, 6A, 68, 7A-7C, BA, BC, 9A and 9C are top views. FIGS. 1B, 2B, 2D, 2F, 3B, 8B, BD, 96 and 9D are side views. FIG. 1C is a bottom view.

In FIGS. 1A-7C and 9D the lens and the frame are positioned at different planes (lens below the frame), and there is an overlap region between the lens and the frame in which the lens contacts the frame. In various figures the overlap region 25 represents a portion of the frame that overlaps with (is in contact with) a portion of the lens.

In FIGS. 8A-9B the lens and the frame are located at the same plane.

Figure 9A:
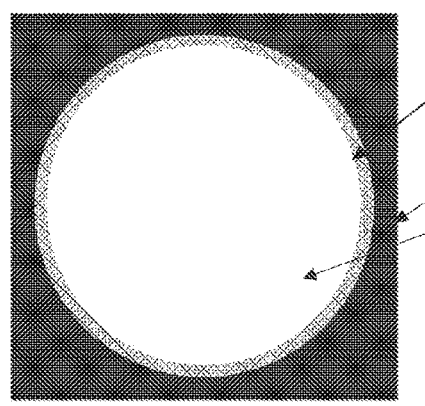
FIGS. 9A-9D are examples of at least one optical unit.
Figure 9B:
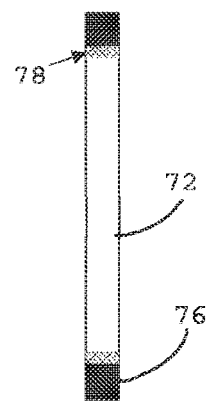
Figure 9C:
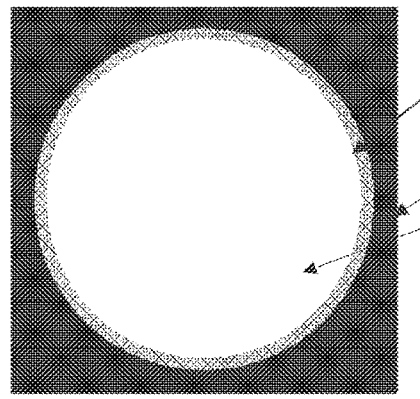
Figure 9D:
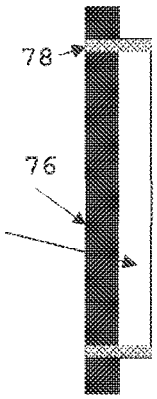

In FIGS. 9C-9D the lens and the frame are located at different planes and a flexible interface overlaps both the frame and the lens. It should be noted that there may be various relationships between the lens and the frame. The lens may be of the same thickness as the frame. At least one portion of the lens may have a different thickness than at least one portion of the frame.

At least one portion of the lens and at least one portion of the frame may be located in the same plane. At least one portion of the lens and at least one portion of the frame may be located at different planes.

A top of the lens may be at a same height as a top of the frame. A top of the lens may be at a different height as the top of the frame. A bottom of the lens may be at a same height as a bottom of the frame. A bottom of the lens may be at a different height as the bottom of the frame.

For simplicity of explanation, various figures (for example FIGS. 2A, 2C, 2E, 3A) illustrate the overlap region 25 between the frame and the lens, and not the entire frame.

In the following examples it is assumed that the lens is made of glass, and that the frame is made of silicon. These are merely examples, and other materials may be used. The lens can be made of any transparent, semi-transparent, or non-transparent material. The frame can made of any transparent, semi-transparent, or non-transparent material whose coefficient of thermal expansion is different than that of the lens. In some examples the lens is made of any one of the following materials: glass, plastic, or germanium. In some examples the frame is made of silicon.

The lens and/or the frame may have any cross section, and the few cross sections of the lens illustrated in the various figures are merely examples.

The lens may have the same thickness as the frame, or may have a different thickness than the frame.

Various dimensions (thickness, width, length) are provided in the following text. These are merely non-limiting examples.

Various contour lines are illustrated in various figures. These contour lines illustrate results of simulations that represent subjecting the lens and the frame to a temperature that ranges from 20° C. to 60° C. and assume that the silicon CTE is 2.6 ppm/K and that the Glass CTE is 3.36 ppm/K, respectively. The values of the contour lines, and their shape and location in the lens, are merely non-limiting examples.

Under these circumstances the lens is forced to deform and create a bow which is shown by the contours. The bow values are given in nano-meters.

FIGS. 1A-1C depict a spring suspended system that includes a lens 21 (such as a glass lens) that is attached to frame 22 (such as a silicon frame that is formed from an etched silicon-on-glass wafer) that is attached to a flexure 19.

The contour lines of FIG. 1A show the bow values (1, 5, 10, 15 and 18 nano-meters) of lens 21.

FIGS. 2A-2F show the effect of various mechanical support boundary conditions on the bow of lens 21 that is attached to a ring portion 25 of frame 22 that overlaps the lens. In FIG. 1C the inner edge of the frame is denoted 24.

FIGS. 2A-2B show the curvature of the lens assuming a simple support on the top outer edge of the ring portion 25.

The contour lines of FIG. 2A show the bow values (1, 5, 10 and 15 nano-meters) of lens 21.

FIGS. 2C-2D show the curvature of the lens assuming a fixed support on the outer circular surface of the overlap ring portion 25 (also referred to herein as "overlap region").

The contour lines of FIG. 2C show the bow values (1, 10, 100, 200 and 280 nano-meters) of lens 21.

FIGS. 2E-2F show the curvature of the lens assuming a double simple/translation 32 without bending support on the top surface of the overlap ring portion 25.

The contour lines of FIG. 2E show the bow values (1, 5 and 9 nano-meters) of lens 21.

Since in FIGS. 1A-1C the overlap ring portion 25 is only a part of the whole frame, the actual boundary condition on its side surface should result in a constraining effect whose degree is somewhere between that of a simple support and that of a fixed support.

FIGS. 2A-2D show that the equivalent type of mechanical support is much closer to a simple support 31 than a fixed support. In fact, as the frame (50 micrometers thick) is relatively flexible when compared to the lens (250 micrometers thick), it relatively easily deflects, which allows it to absorb some of the thermal stress which would otherwise be transferred to the additional bow of the lens.

FIGS. 2E-2F imply that it is beneficial to design a boundary condition on the overlap region, such that it is equivalent to a combination of a simple support, which allows it to thermally expand in plane, and a counteracting bending moment which inhibits lens bow.

Figure 3A:
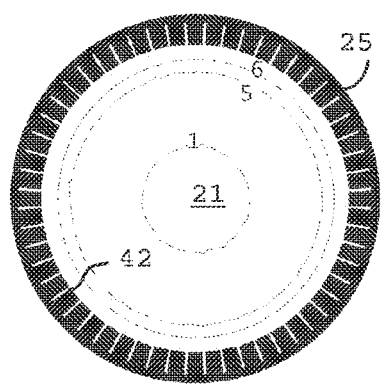
FIGS. 3A-3B are examples of at least one optical unit.
Figure 3B:
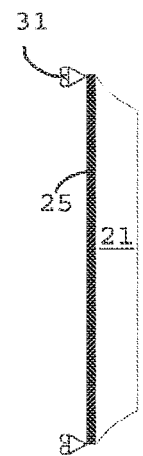

FIGS. 3A-3B show the effect of 56 radial grooves 42 made in the overlap ring portion 25.

The contour lines of FIG. 3A show the bow values (1, 5 and 6 nano-meters) of lens 21.

In FIGS. 3A-7C various grooves are made in the frame and allow to absorb thermal elongation differences in the lens and the frame.

Assuming a simple support on the edge of the overlap region, FIGS. 2A-2B and 3A-3B demonstrate that radial grooves significantly reduce aperture bow by 60% of the maximum bow value. More significantly though, the radial distance between the 1 nm and 5 nm bow contours significantly increases, thus making the central region of the lens flatter. The radial grooves' base diameter is 2.3 mm and its width is 10 micrometers.

Figure 4A:
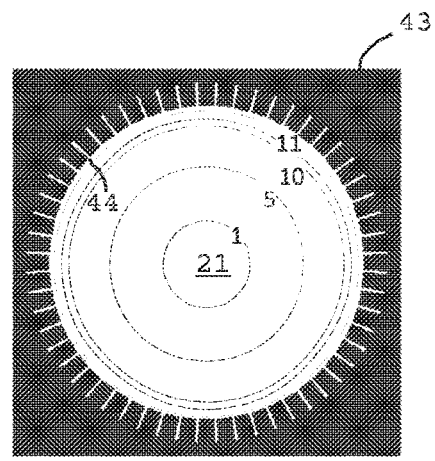
FIGS. 4A-4B are examples of at least one optical unit.
Figure 4B:
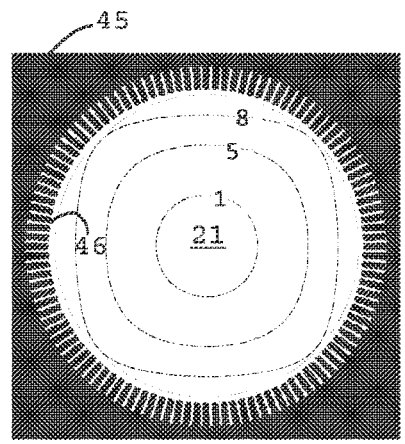

FIGS. 4A-4B show the effect of embedding 56 (44) and 112 (46) radial grooves in the silicon layer of the device of FIGS. 1A-1C.

The contour lines of FIG. 4A show the bow values (1, 5, 10 and 11 nano-meters) of lens 21.

The contour lines of FIG. 4B show the bow values (1, 5 and 8 nano-meters) of lens 21.

Evidently, maximum lens bow value is reduced by nearly 40% and 55%, respectively, while the central area of the lens becomes much flatter.

As the frame (43; 45) may serve as part of an actuation electrode, a factor to consider is the reduction in the actuation area. Multiple thin radial grooves have the potential to mitigate lens bow, while not affecting the actuation area much. In fact, for the grooves in FIGS. 4A-4B, area reduction is merely 2.6 and 5.2%, for 56 (44) and 112 (46) grooves, respectively.

Figure 5:
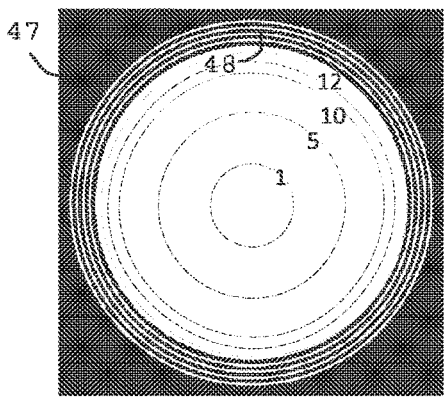
FIG. 5 is an example of at least one optical unit.

FIG. 5 shows the effect of embedding four circular grooves 48 in a layer that includes the frame 47. The width of the grooves is 40 micrometers. The number of circular grooves may differ from 4. In FIG. 5 the 4 circular grooves 48 are coaxial and are formed in the overlap ring portion 25, and their surroundings are connected to the lens.

The contour lines of FIG. 5 show the bow values (1, 5, 10 and 12 nano-meters) of lens 21.

Evidently, maximum lens bow value may be reduced with this configuration, by nearly 40%. However, as opposed to radial grooves, here the actuation area is reduced by nearly 20%.

Figure 6A:
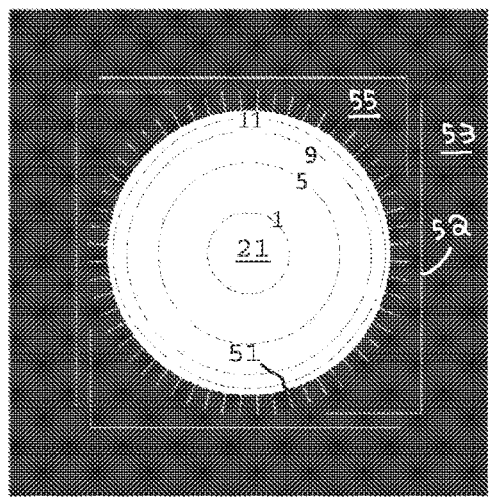
FIGS. 6A-6B are examples of at least one optical unit.
Figure 6B:
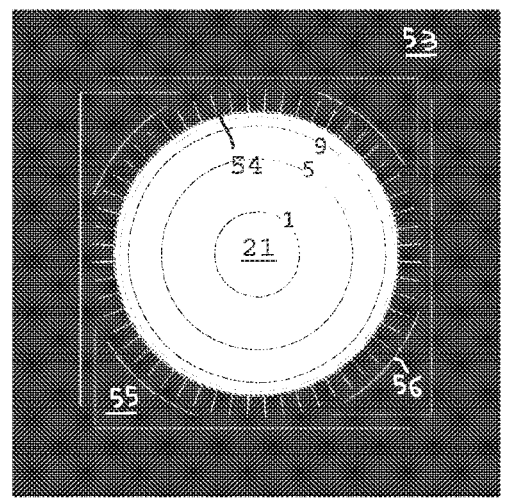

FIGS. 6A-6B show an example in which a layer includes an anchor, a frame, and also includes flexures such as suspension springs that are defined by trenches 52. The frame 55 may be partially surrounded by the flexures. An anchor 53 may be located outside the flexures. FIG. 6A illustrates 4 L-shaped flexures defined by trenches 52 and also shows 4 inner trenches 56 of a curved shape. Each inner flexure may be parallel to a corresponding part of an inner space defined by the frame.

In FIGS. 6A and 6B there are 56 radial grooves (51, 54).

FIG. 6B illustrates that adding partially circular grooves 56 increases the flexibility of the frame and helps to further reduce the lens bow, by nearly an additional 20%.

The contour lines of FIGS. 6A and 6B show the bow values (1, 5, 9 and 11 nano-meters) of lens 21.

Figure 7A:
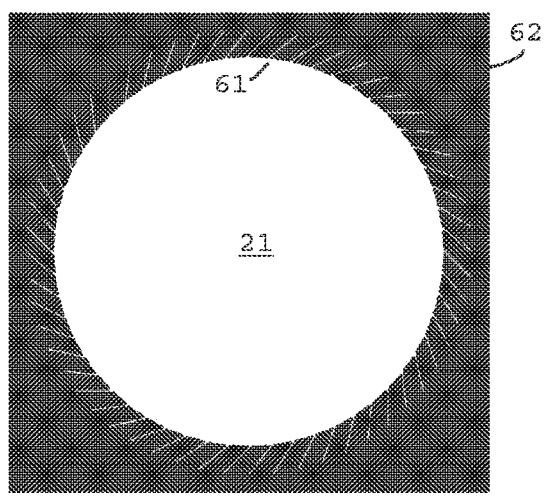
FIGS. 7A-7C are examples of at least one optical unit.

The contour lines of FIG. 6B show the bow values (1, 5 and 9 nano-meters) of lens 21. FIG. 7A shows angled grooves 61 that are linear, but do not extend in a radial manner from the inner space defined by the frame 62. Each groove is oriented from a radial groove.

Figure 7B:
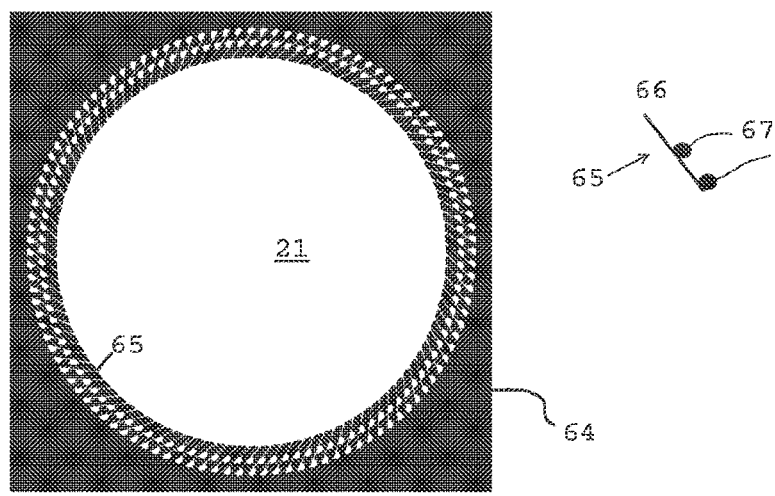
Figure 7C:
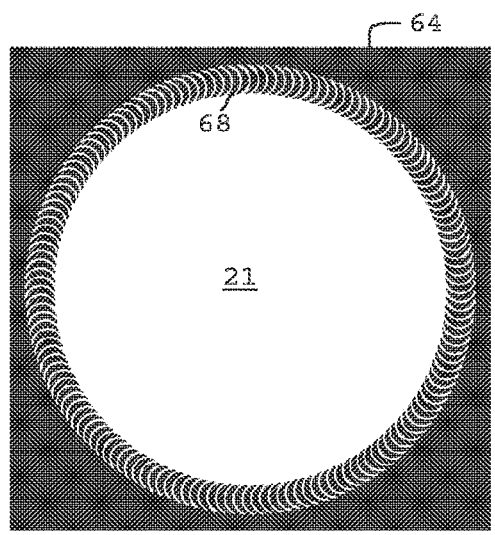

FIG. 7B shows grooves 65 that have an angled linear part 66 and additional through holes 67 (that are wider than the linear part) for increased flexibility of the frame-lens interface. FIG. 7C shows a pattern of curved grooves 68. These grooves are arranged around the inner space defined by the frame 64.

FIGS. 8A-8D show other configurations in which the frame 71 and lens 72 are formed in the same single thickness hybrid layer.

Figures 8A, 8B:
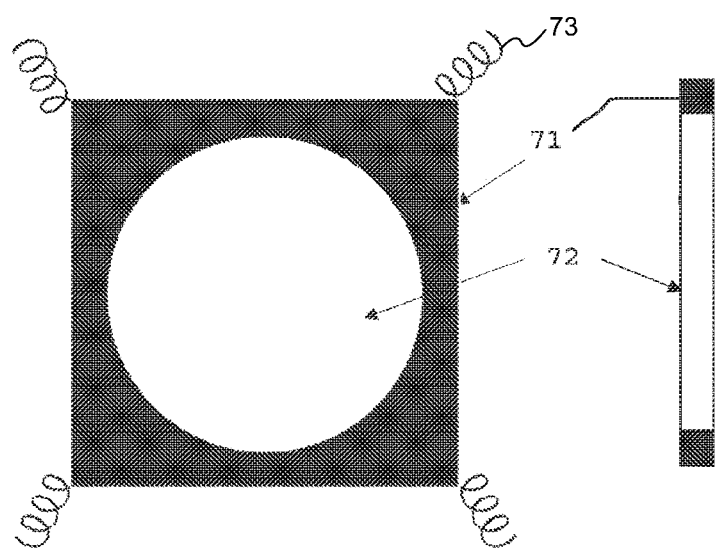
FIGS. 8A-8D are examples of at least one optical unit.

Any of the flexures shown in the previous figures may also be implemented in this configuration. FIG. 8A illustrates springs 73 that are mechanically connected to frame 71.

Figures 8C, 8D:
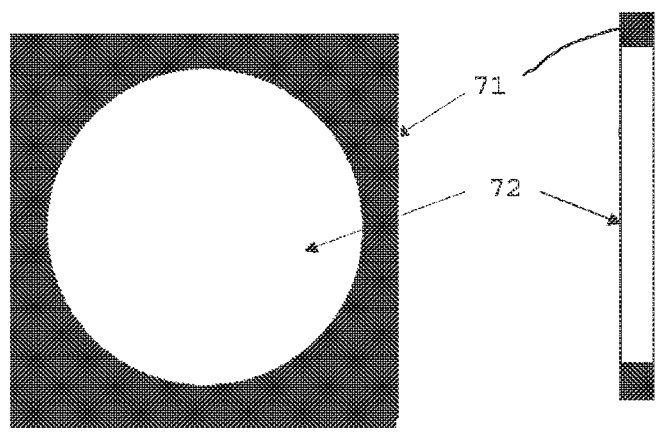

Frame 71 of FIGS. 8C-8D is static. It is noted that the frame may be integrated in some other mechanical structures through any type or number of rigid or flexible structures.

FIGS. 9A-9D show a flexible interface 78 that interfaces with the lens 72 and the frame 76. The flexible interface 78 may include at least one of the lens or frame material and may have any of the flexure structures described above, or any other structure.

Figure 10:
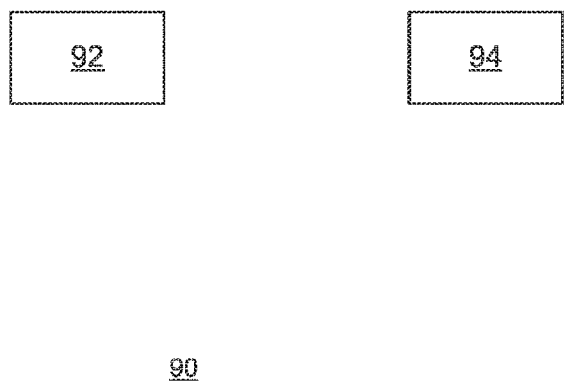
FIG. 10 is an example of a method.

FIG. 10 illustrates an example of method 90.

Method 90 may include steps 92 and 94. Steps 92 and 94 may be executed in parallel to each other, in a partially overlapping manner, or in a non-overlapping manner.

Step 92 may include applying at least one optical operation by an optical unit that includes a lens and a frame that is configured to support the lens. The lens has a CTE of a first value. The frame has a CTE of a second value. The first value differs from the second value.

Step 94 may include compensating, by a flexible interface of the optical unit, for differences between thermal expansions of the lens and of the frame. This may involve allowing a relative movement of at least one portion of the lens in relation to at least one portion of the frame, or vice versa.

The flexible interface may be included in the frame, may be included in the lens, may be included in both lens and frame, or may neither be included in the lens, nor In the frame.

Any of the mentioned above flexible interfaces may be implemented in any of the following tunable MEMS etalon devices. For example, the flexible interface may be formed between frame 108 and top mirror 104, may be included (in least in part) in frame 108, and/or may be included (in least in part) in top mirror 104.

Figure 11A:
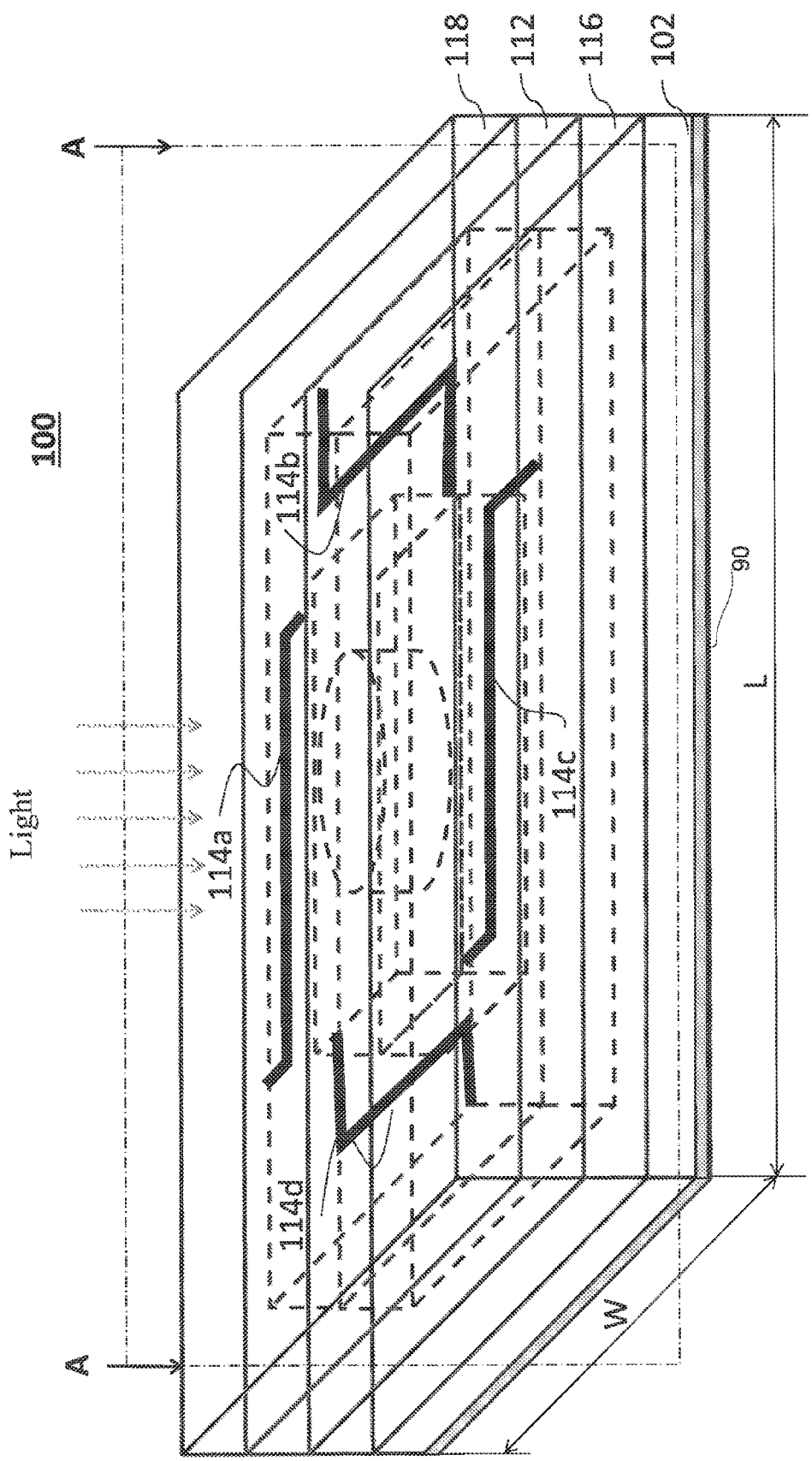
FIG. 11A shows schematically, in an isomeric view, a tunable MEMS etalon device, according to an example of the presently disclosed subject matter.
Figure 11B:
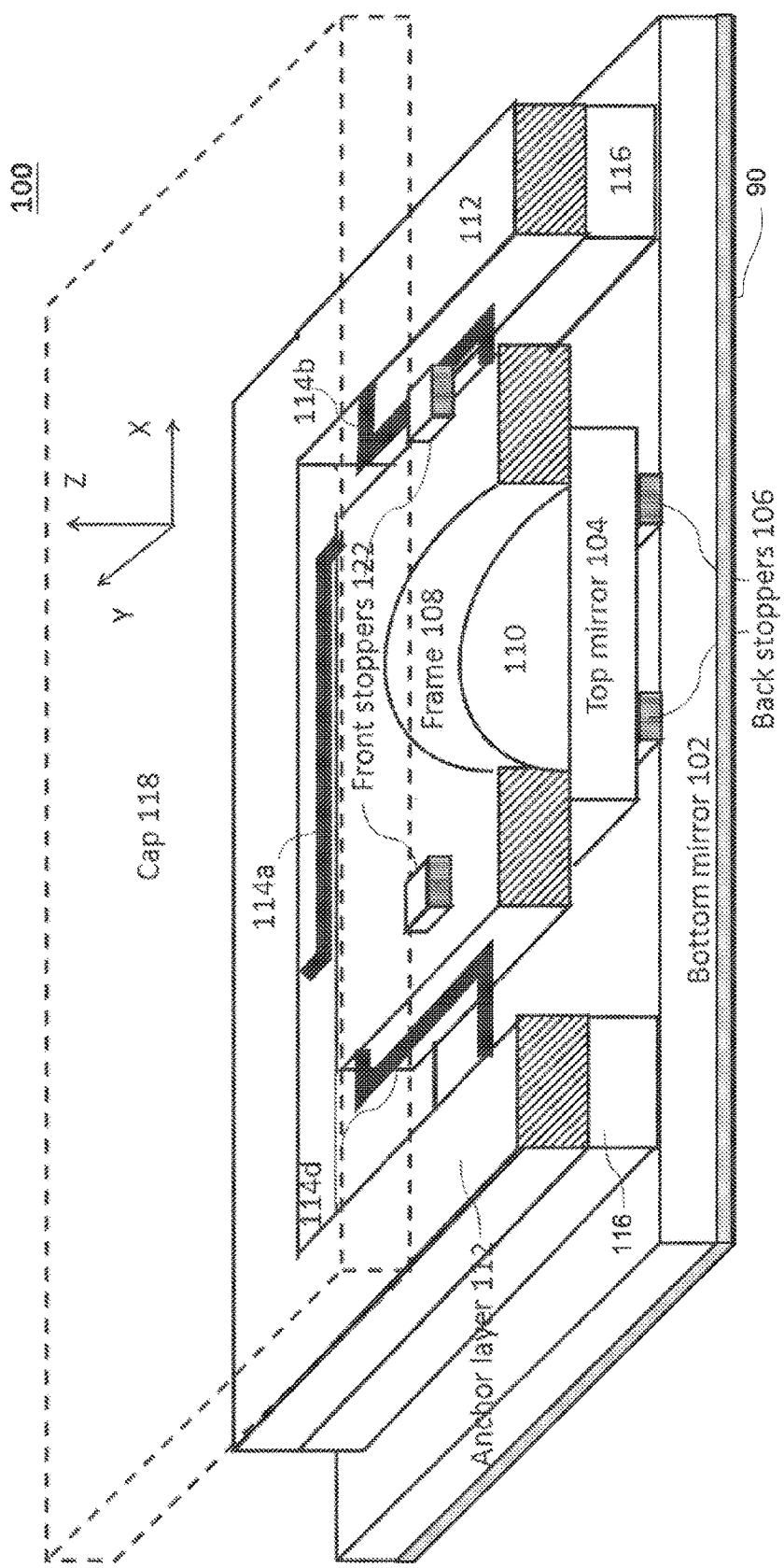
FIG. 11B shows schematically the device of FIG. 11A with a cross section, according to an example of the presently disclosed subject matter.
Figure 12A:
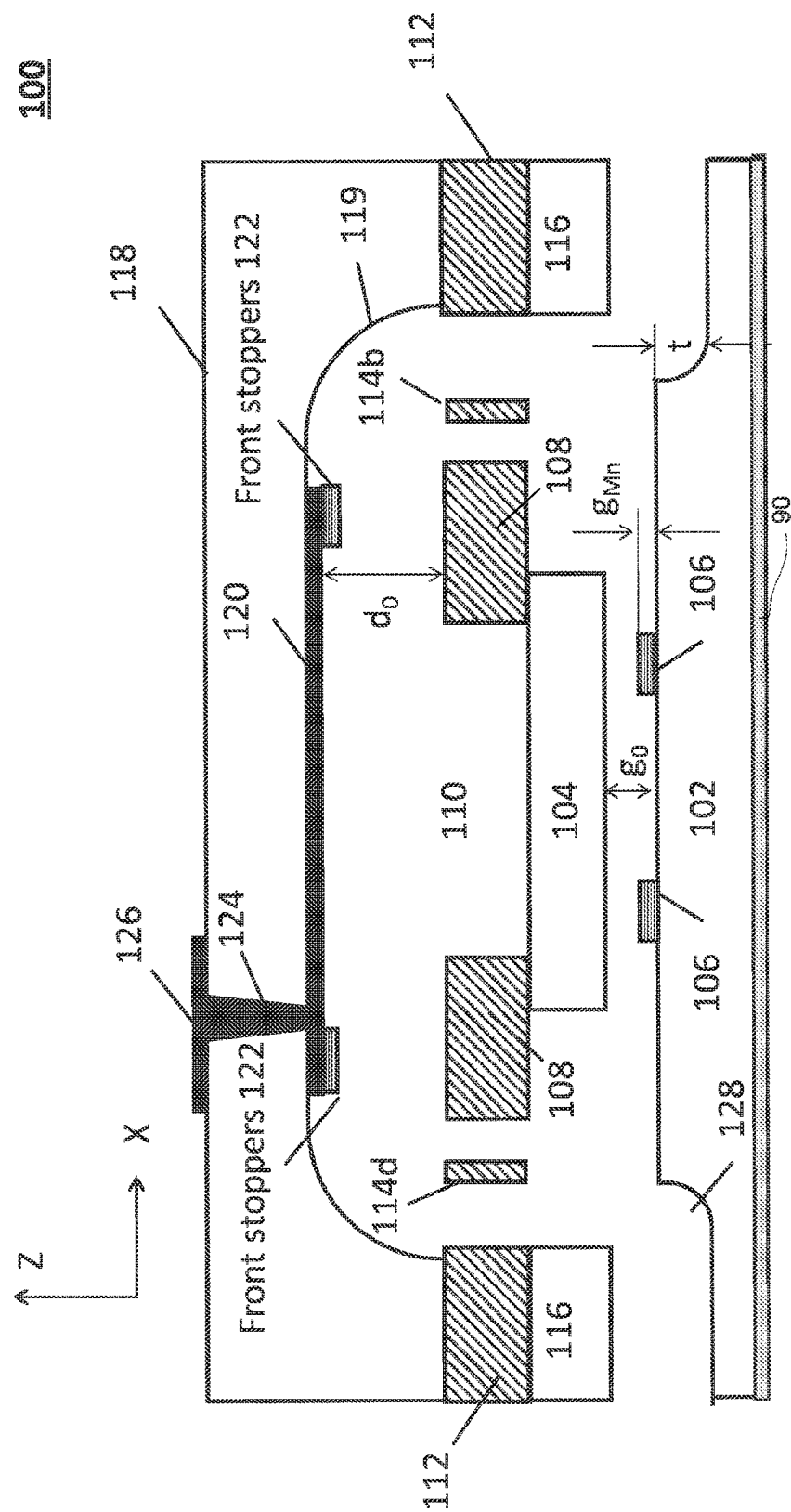
FIG. 12A shows the device of FIG. 11B in an initial as-fabricated, non-stressed un-actuated state, according to an example of the presently disclosed subject matter.
Figure 12B:
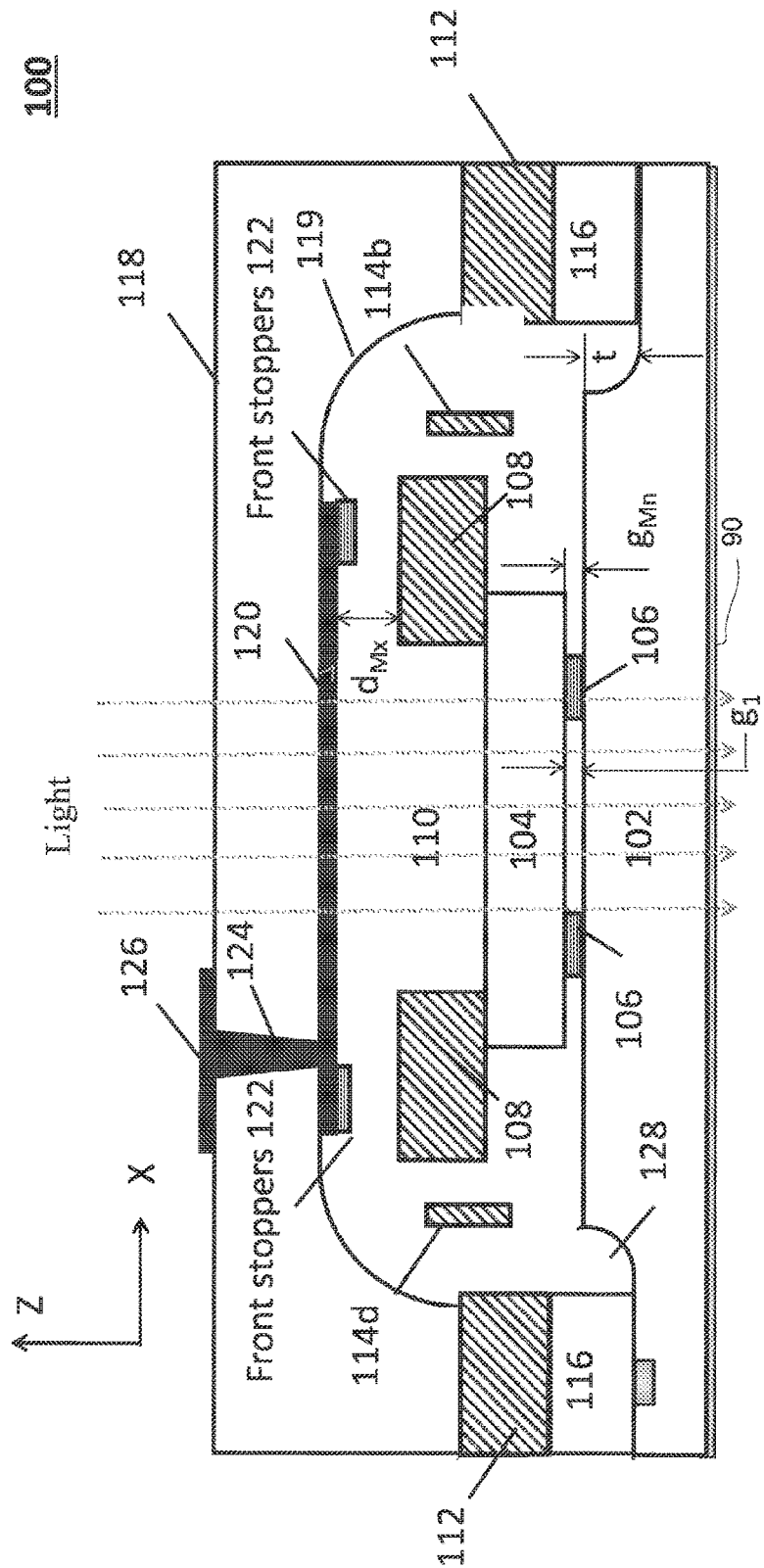
FIG. 12B shows the device of FIG. 12A in an initial pre-stressed un-actuated state, according to an example of the presently disclosed subject matter.
Figure 12C:
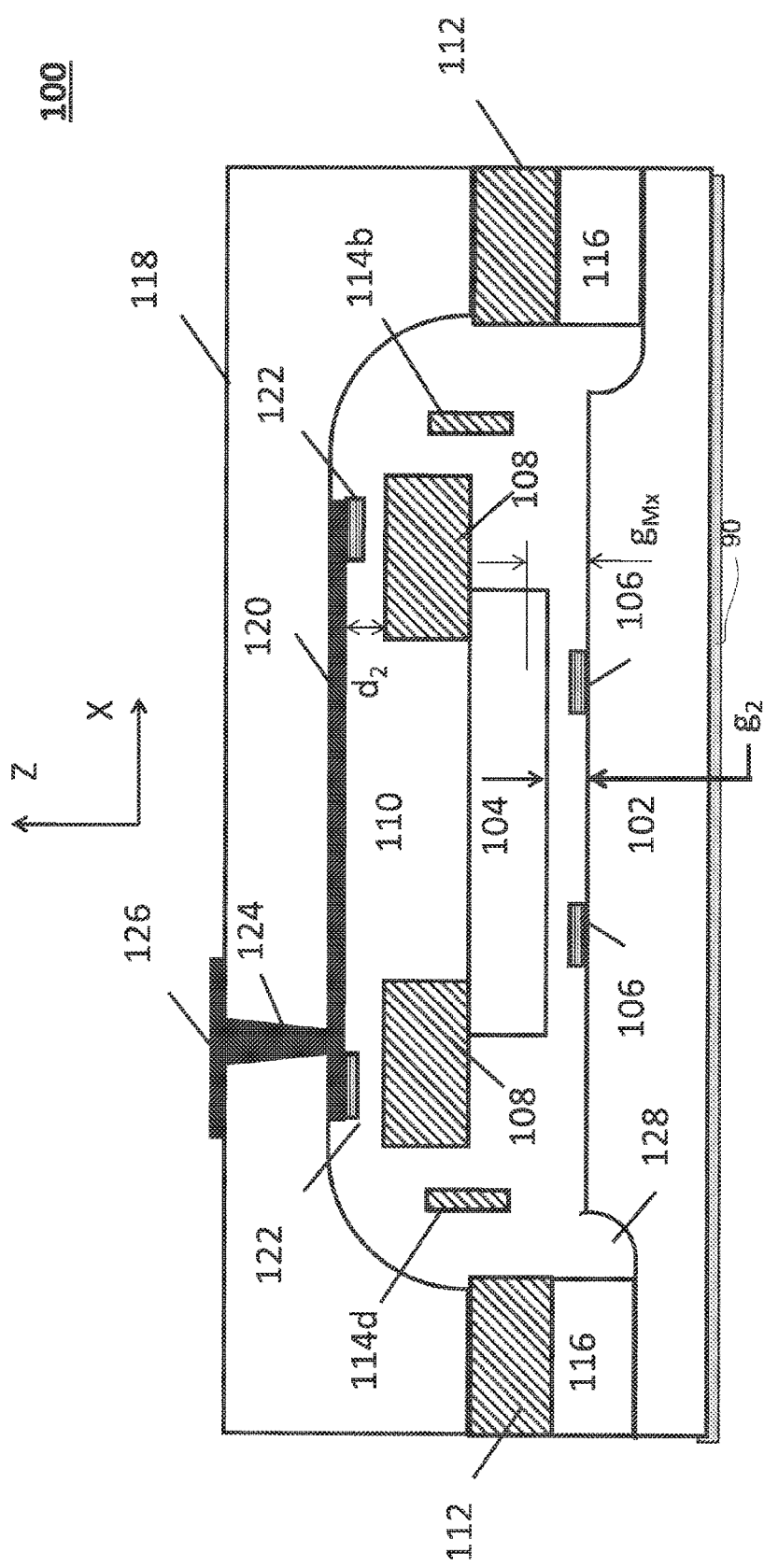
FIG. 12C shows the device of FIG. 12B in an actuated state, according to an example of the presently disclosed subject matter.

FIG. 11A shows schematically, in an isometric view, a first example of a tunable MEMS etalon device disclosed herein and numbered 100. FIG. 11 shows an isometric cross section of device 100 along a plane marked A-A. Device 100 is shown in conjunction with a XYZ coordinate system, which also holds for all following drawings. FIGS. 12A, 12B and 12C show cross sections of device 100 in plane A-A in three configurations (states): an as-fabricated (non-stressed) un-actuated state (FIG. 12A), a pre-stressed un-actuated state (FIG. 12B), and an actuated state (FIG. 12C). Device 100 comprises two substantially flat and parallel mirrors/reflective surfaces, a bottom (or "back") mirror 102 and a top (or "aperture") mirror 104 separated by a "back" gap. As used herein, the terms "front" and "back" reflect the orientation of the device toward light rays.

As shown, the front (top) mirror is the first mirror In the path of light rays entering the etalon. In one example, the mirrors are formed in flat plates or wafers made of transparent or semi-transparent material to light, in a desired wavelength range transmitted by the tunable etalon filter (e.g., glass). As used herein, the term "plate", "wafer" or "layer" refers to a substantially two-dimensional structure with a thickness defined by two parallel planes and having a width and a length substantially larger that the thickness. "Layer" may also refer to a much thinner structure (down to nanometers-thick, as opposed to a typical thickness of micrometers for the other layers).

In an embodiment, back mirror 102 is formed in a glass layer that also serves as a substrate of the device. In other embodiments, back mirror 102 may be formed in a "hybrid" plate or hybrid material such that a central section ("aperture") through which the light rays pass is at least partially transparent to the wavelength of the light (made e.g., of a glass), while plate sections surrounding the aperture are made of a different material, for example silicon. The hybrid aspect may increase the stiffness and strength of the mirror.

In the as-fabricated state, FIG. 12A, the back gap between the front and back mirrors has a size marked by $g_0$. In the un-actuated state, FIG. 12B, the back gap has a size marked by $g_1$. In an actuated state, FIG. 12C, the back gap has a size marked by $g_2$. The mirrors are movable with respect to each other, so that back gap can be tuned between certain minimal ($g_{Mn}$) and maximal ($g_{Mx}$) gap sizes. The movement is in the Z direction in the particular coordinate system shown. Specifically, according to certain examples disclosed herein, back mirror 114 (facing sensor side relative to front mirror) is fixed, and front mirror 104 (facing object side relative to back mirror) Is movable. The gap size is minimal in the pre-stressed un-actuated state, so $g1=g_{Mn}$. The maximal back gap size g& corresponds to a "maximal" actuated state. There are, of course, many actuated states (and even a continuous range of states) in which the back gap has a value $g_2$ between $g_{Mn}$ and $g_{Mx}$.

Device 100 may further comprise a first stopper structure (also referred to as "back stoppers") 106 positioned between mirrors 102 and 104 in a way such as not to block light rays designed to reach an image sensor. Back stoppers 106 may be formed on either mirror. In the initial as-fabricated un-actuated state, FIG. 12A, the two mirrors are located in close proximity to each other, the minimal gap distance $g_{Mn}$ being defined by back stoppers 106 which function as displacement limiters. An additional function of stoppers 106 is to prevent undesirable displacement of the front mirror due to external shock and vibration. Back stoppers 106 are designed to prevent contact between the mirrors and ensure that $g_{Mn}$ is never zero. They may be located within an optical aperture area if their size is small, and they do not significantly obscure the optical signal. The location of the back stoppers within an optical aperture area may be optimized in such a way that the displacement of movable front mirror 104 is minimal. In some examples, back stoppers 106 are made of a metal such as a patterned Cr—Au layer, Ti—Au layer or Ti—Pt layer. The degrees of reflectivity/transparency of the top and back mirrors are selected in accordance with the desired spectral transmission properties of the etalon. According to some examples, each mirror is at least semi-reflective to some degree.

Device 100 further comprises a mounting frame structure (or simply "frame") 108 with an opening ("aperture") 110. Frame 108 is made of an opaque, transparent, or semi-transparent material (for example single crystal silicon) and is fixedly attached (e.g., by bonding) to front mirror 104. That is, mirror 104 is "mounted" on frame 108 and therefore moves together with frame 108. Opening 110 allows light rays to enter the etalon through the front mirror. Therefore, the front mirror is also referred to sometimes as an "aperture mirror".

In some examples, back mirror 102 and optionally front mirror 104 include a Titanium Oxide (TiO2) layer deposited on a glass layer/substrate. In certain examples, a device disclosed herein may comprise one or more electrodes (not shown) formed on back mirror 102 on the surface facing frame 108, to enable actuation of the frame structure (and thereby cause movement of the front mirror) toward the back mirror. Alternative actuation mechanisms may be applied, e.g., piezoelectric actuation, Kelvin force, etc. The movement of the front mirror towards or away from the back mirror tunes the spectral transmission band profile of the etalon.

Device 100 further comprises an anchor structure (or "anchor layer" or simply "anchor") 112, made of an opaque, a transparent, or semi-transparent material (for example single crystal silicon). Anchor 112 and frame 108 are attached to each other by a flexure/suspension structure. The suspension structure may, for example, be a region of anchor structure 112 patterned in the form of a bending or torsional spring, a combination of such springs, or as a thin doughnut-shaped membrane adapted to carry the front mirror. In device 100, the suspension structure includes a plurality of suspension springs/flexures. According to some examples, in device 100, the plurality of suspension springs/flexures includes four springs, 114a, 114b, 114C and 114d, made of opaque, transparent, or semi-transparent material (for example single crystal silicon).

Figure 13:
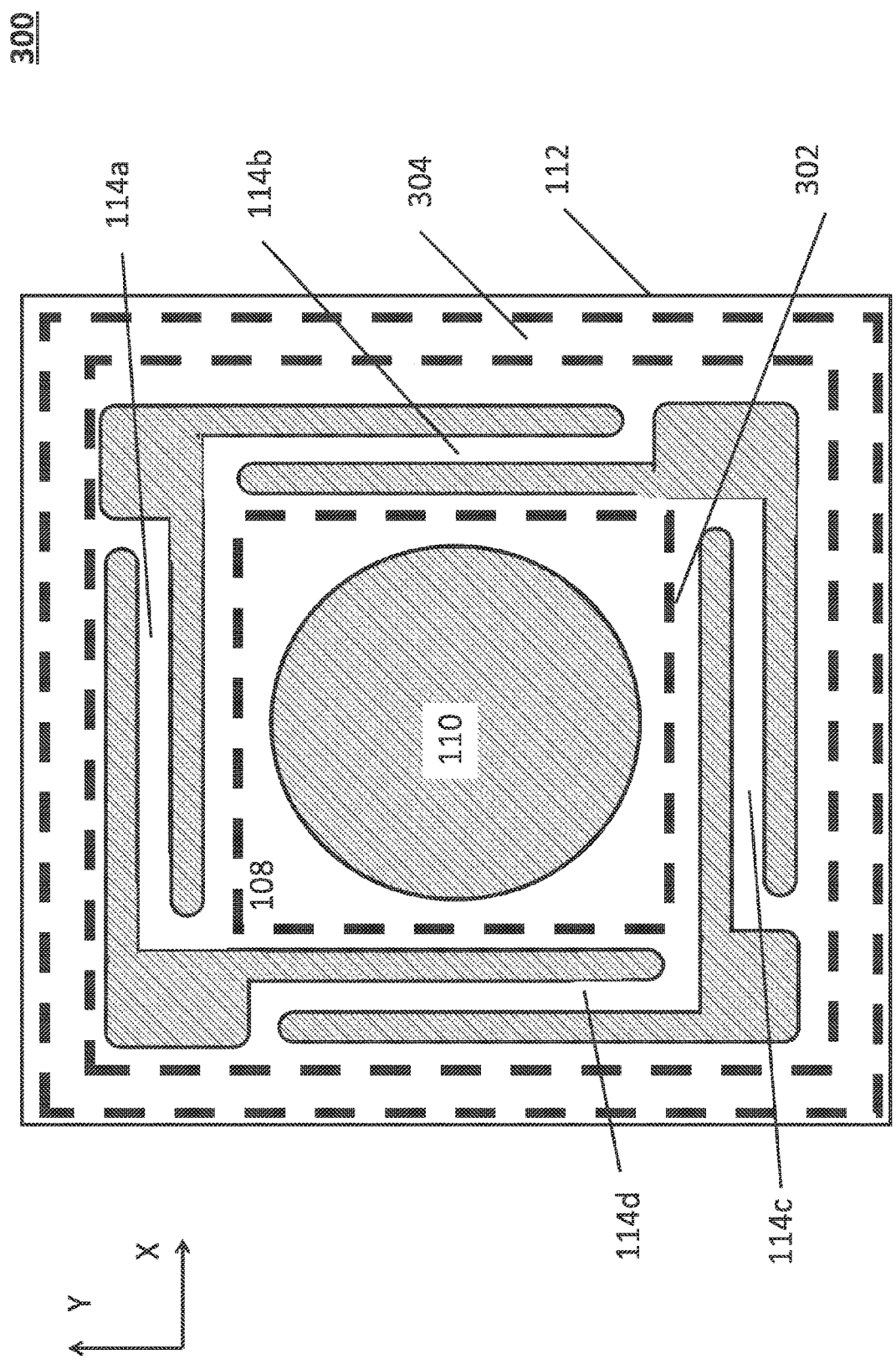
FIG. 13 shows schematically a top view of the functional mechanical layer in the device of FIG. 11A or FIG. 11B, according to an example of the presently disclosed subject matter.

Together, frame 108, anchor 112 and springs 114 form a "functional mechanical layer" 300, shown in a top view in FIG. 13. In the following discussion, the term "silicon" Is used as a general non-limiting example. It is noted that the term silicon should not be construed as limiting, and other materials are also contemplated, including any material or combination of materials with suitable flexibility and durability required for the flexure structure to function in a desired way, for example plastic or glass.

FIGS. 12A-12C show that a surface of front mirror 104 facing incoming light is attached to frame 108. A different configuration of front mirror 104 and frame 108 is described below with reference to FIG. 20. It also shows that a flexure structure, comprising four springs 114a, 114b, 114C and 114d (see FIG. 13), is attached to anchor 112 and to frame structure 108 but is not attached to the front mirror.

In some examples, frame 108 is spaced apart from back mirror 102 by a spacer structure (or simply "spacers") 116. According to some examples, spacers 116 can be formed of a glass material. Spacers 116 are used to separate the frame and springs from the plate in which mirror 102 is formed. While, in principle, silicon anchors 112 could be attached to the bottom plate directly without spacers 116, this requires very large deformation of the springs. For the adopted geometry, this deformation is beyond the strength limit of the spring material, which requires the presence of spacer layer 116. For technological reasons, in some examples, both movable front mirror 104 and spacers 116 are fabricated from the same glass plate (wafer). This simplifies fabrication, since the glass and silicon wafers are bonded at wafer level. For this reason, device 100 is referred to herein as a glass-silicon-glass (GSG) device.

Device 100 further comprises a cap plate (or simply "cap") 118 accommodating at least part of an actuation mechanism configured for controlling gap size between the front mirror and the back mirror. As shown, cap 118 is located at the object side relative to front mirror 104 at the direction of incoming light. In the example of electrostatic actuation, cap 118 accommodates electrodes 120 formed on or attached thereto (see FIGS. 12A to 12C). Electrodes 120 can be positioned for example at a bottom side (facing the mirrors) of cap 118. Electrodes 120 are in permanent electrical contact through one or more through-glass vias 124 with one or more bonding pads 126 positioned on the opposite (top) side of cap 118. Electrodes 30 120 are used for actuation of frame 108 (thereby causing movement of front mirror 104). The cap comprises a first recess (cavity) 119 to provide a "front" (also referred to as "electrostatic") gap d between frame 108 and electrodes 120. In the as-fabricated configuration (before the bonding of the device to the back mirror), FIG. 12A, gap d has a size $d_0$. After bonding, in the pre-stressed un-actuated state shown in FIG. 12B, gap d has a maximal size $d_{Mx}$. In any actuated state (as in FIG. 12C), gap d has a size d2. Device 100 further comprises front stoppers 122 that separate between frame 108 and cap 118. In some examples, front stoppers 122 isolate electrically (prevent electrical shorts between) frame 108 from cap electrodes 120. In some examples, front stoppers 122 define a maximal gap between front mirror 104 and back mirror 102.

In one example, the cap is made of a glass material. In other examples, cap 118 may be made of a "hybrid" plate or hybrid material, such that a central section ("aperture") through which the light rays pass, is at least partially transparent to the wavelength of the light (made e.g., of glass), while plate sections surrounding the aperture are made of a different material, for example silicon. The hybrid aspect may increase the stiffness and strength of the cap.

In certain examples, particularly where imaging applications are concerned, the length L and width W (FIG. 11A) of mirrors 102 and 104 should, on one hand, be large enough (e.g., in the order of several hundred micrometers (^m) to several millimeters (mm)) to allow light passage to a relatively wide multi-pixel image sensor. On the other hand, the minimal gap $g_{Mn}$ should be small enough (e.g., a few tens of nanometers (nm)) to allow desired spectral transmission properties of the etalon. This results in a large aspect ratio of the optical cavity between the mirrors (e.g., between the lateral dimensions W and L and the minimal gap distance $g_{Mn}$), which, in turn, requires that accurate angular alignment is maintained between the mirrors, to reduce or prevent spatial distortion of the chromatic spatial transmission band of the etalon along the width/lateral spatial directions thereof. In some examples, $g_A$ may have a value of down to 20 nanometers (nm), while $g_{Mx}$ may have a value of up to 2^m. According to one example, the value of $g_{Mx}$ may be between 300 to 400 nm. Specific values depend on the required optical wavelength and are dictated by a specific application. Thus, in some examples, $g_{Mx}$ may be greater than $g_{Mn}$ by one to two orders of magnitude. In certain examples, L and W may each be about 2 millimeter (mm) and springs 114 may be each about 50 p,m thick, about 30 p,m (Peleg, does p,m mean Picometer?) wide and about 1.4 mm long. In certain examples, the thicknesses of the glass layers of the cap 118, the back mirror 102, and the front mirror 104, may be about 200 to 500^m. In some examples, L-W.

It should be understood that all dimensions are given by way of example only, and should not be considered as limiting in any way.

FIGS. 12A-12C provide additional information on the structure of device 100, as well as on the function of some of its elements. As mentioned, FIG. 12A shows device 100 in an initial as-fabricated and un-actuated, non-stressed state. As-fabricated, front mirror 104 does not touch back stoppers 106. FIG. 12B shows the device of FIG. 12A in an initial pre-stressed unactuated state, with front mirror 104 physically touching back stoppers 106. The physical contact is induced by stress applied on the frame through the springs when spacer layer 116 is forced into contact with the glass wafer substrate (which includes back mirror 102) for eutectic bonding of spacers 116 to the glass plate of back mirror 102, as may be seen in FIG. 9(c). Thus, the exemplary configuration shown in FIG. 12B (as well as in FIG. 15B) is said to be "pre-stressed". FIG. 12C shows the device in an actuated state, with front mirror 104 in an intermediate position between back stoppers 106 and front stoppers 122, moved away from back mirror 102.

In some examples, back mirror 102 includes a second recess 128 with a depth t designed to provide pre-stress of the springs after assembly/bonding. According to some examples, recess depth t is chosen on one hand such that the contact force arising due to deformation of the springs and the attachment of front movable mirror 104 to back stoppers 106 is high enough to preserve the contact in the case of shocks and vibrations during normal handling of the device. On the other hand, in some examples, the combined value of recess depth t plus the maximal required travel distance (maximal back gap size) $g_{Mx}$ is smaller than one third of an as-fabricated ("electrostatic") gap size do of a gap between electrodes 120 and frame 108 (FIG. 12A), to provide stable controllable electrostatic operation of the frame by the electrodes located on the cap. In certain examples, the as-fabricated electrostatic gap $d_0$ may have a value of about 2-4^m and t may have a value of about 0.5-1^m. The requirement for stable operation is $t+g_{Mx}<d_0/3$, since the stable travel distance of a capacitive actuator is ⅓ of the as-fabricated electrostatic gap, i.e., is $d_0/3$.

Note that, in certain examples, an un-actuated state may include a configuration in which movable mirror 104 is suspended and does not touch either back stoppers 106 or front stoppers 122.

In the actuated state, shown in FIG. 12C, the mounting ring and the front mirror are displaced away from the back mirror. This is achieved by applying a voltage V between the one or more regions/electrodes 120 of the actuation substrate serving as an actuating electrode and the one or more regions of frame 108.

According to some examples, device 100 is fully transparent. It includes a transparent back mirror (102), a transparent front mirror (104), and a transparent cap (118), as well as transparent functional mechanical layer 300. One advantage of the full transparency is that the device can be observed optically from two sides. Another advantage is that this architecture may be useful for many other optical devices incorporating movable mechanical/optical elements, such as mirrors, diffractive gratings, or lenses. In some examples, device 100 is configured as a full glass structure, where the functional mechanical layer includes a glass substrate that is patterned to accommodate/define the suspension structure carrying the top mirror, the suspension structure including a plurality of glass springs/flexures.

FIG. 13 shows schematically a top view of functional mechanical layer 300. The figure also shows an external contour 302 of front mirror 104, aperture 110, anchor structure 112, springs 114a-d (flexure structure) and a contour 304 enclosing a eutectic bond frame 121 and cap spacers 122 as further described in more detail with reference to FIG. 14 below.

Figure 14:
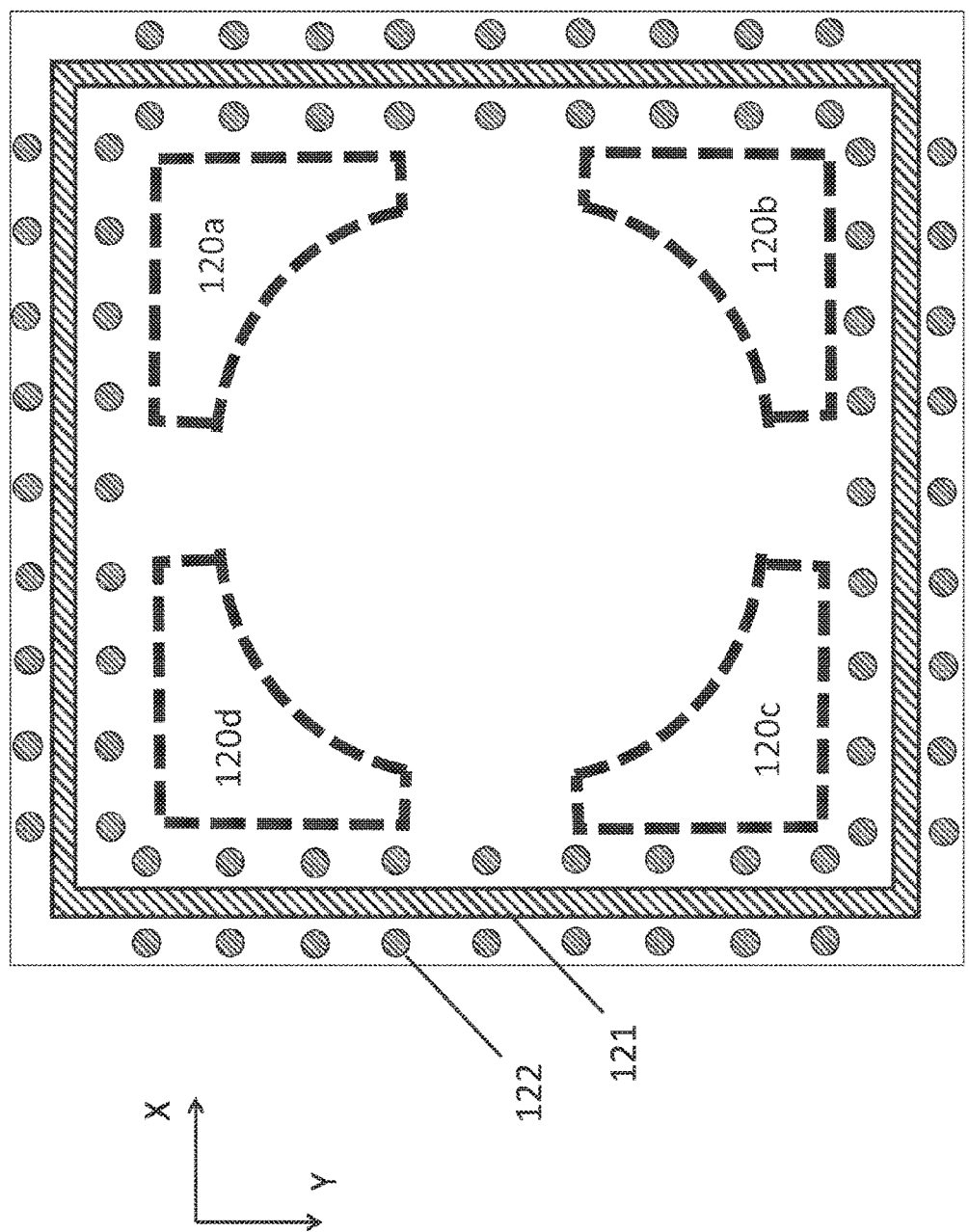
FIG. 14 shows schematically a top view of the cap in the device of FIG. 11A or FIG. 11B with multiple electrodes formed thereon, according to an example of the presently disclosed subject matter.

FIG. 14 shows schematically a top view of cap 118 with a plurality of electrodes 120, marked as 120a, 120b, 120c, and 120d. The number and shape of electrodes 120 are shown byway of example only, and should not be construed as limiting. According to some examples, three electrodes 120 are required to control both the displacement of the frame in the Z direction and the tilting of the frame about X and Y axes. Multiple electrode regions, e.g., as shown in FIG. 14, may be fabricated on cap 118 such that front mirror 104 can be actuated with an up-down degree of freedom (DOF) along the Z direction and can also be tilted (e.g., with respect to two axes X and Y) to provide additional angular DOF(s). This allows adjustment of angular alignment between front mirror 104 and back mirror 102. According to some examples, cap 118 may include a deposited eutectic bonding material 121. Furthermore, spacers 122 may be used to precisely control the electrostatic gap between the cap electrodes 120 and the actuator frame 108 serving as the second electrode. According to the presently disclosed subject matter, the eutectic bonding material 121 can be made to assume the shape of a frame. In such cases, spacers 122 can be placed on both sides of the frame (inner and outer) and thereby minimize bending moments acting on the cap as a result of the eutectic bonding shrinkage during the bonding process.

Following is an example of a method of use of device 100. Device 100 is actuated to bring the etalon from the initial pre-stressed un-actuated state (FIG. 12B) to an actuated state (e.g., as in FIG. 12C). The actuation moves frame 108 and front mirror 104 away from back mirror 102, increasing the back gap between the mirrors. An advantageously stable control of the back gap is enabled by the innovative design with an initial as-fabricated (and non-stressed) state. More specifically, this design includes an initial maximal as-fabricated (and non-stressed) front gap size do (FIG. 12A), which is about three times larger than the combined recess depth t and the maximal required travel (back gap) size $g_{Mx}$. This is because the stable range of the parallel capacitor electrostatic actuator is one third of the initial distance between the electrodes.

According to one example, device 100 may be used as a pre-configured filter for specific applications. For example, the device may be pre-configured to assume two different states, where the gap between the mirrors in each one of the two states (as set by the stoppers) is according to the desired wavelength. For example, one state provides a filter that allows a first wavelength range to pass through the etalon, while the other state allows a second wavelength range to pass through the etalon. The design for such a "binary mode" filter is related to a simple and accurate displacement of the mirrors between the two states, and allows simplified manufacturing.

According to one example, one state is the initial un-actuated etalon state g1 (where the gap size between the mirrors is defined by stoppers 106) selected to allow a first wavelength range to pass through the etalon, and the other state is one actuated state in which the gap has an actuated gap size g2, greater than the pre-stressed un-actuated gap size, and resulting in electrical gap d2 which is equal to the height of front stoppers 122, selected to allow a second wavelength range to pass through the etalon. In the second state, frame 108 is in contact with front stoppers 112.

Figure 15A:
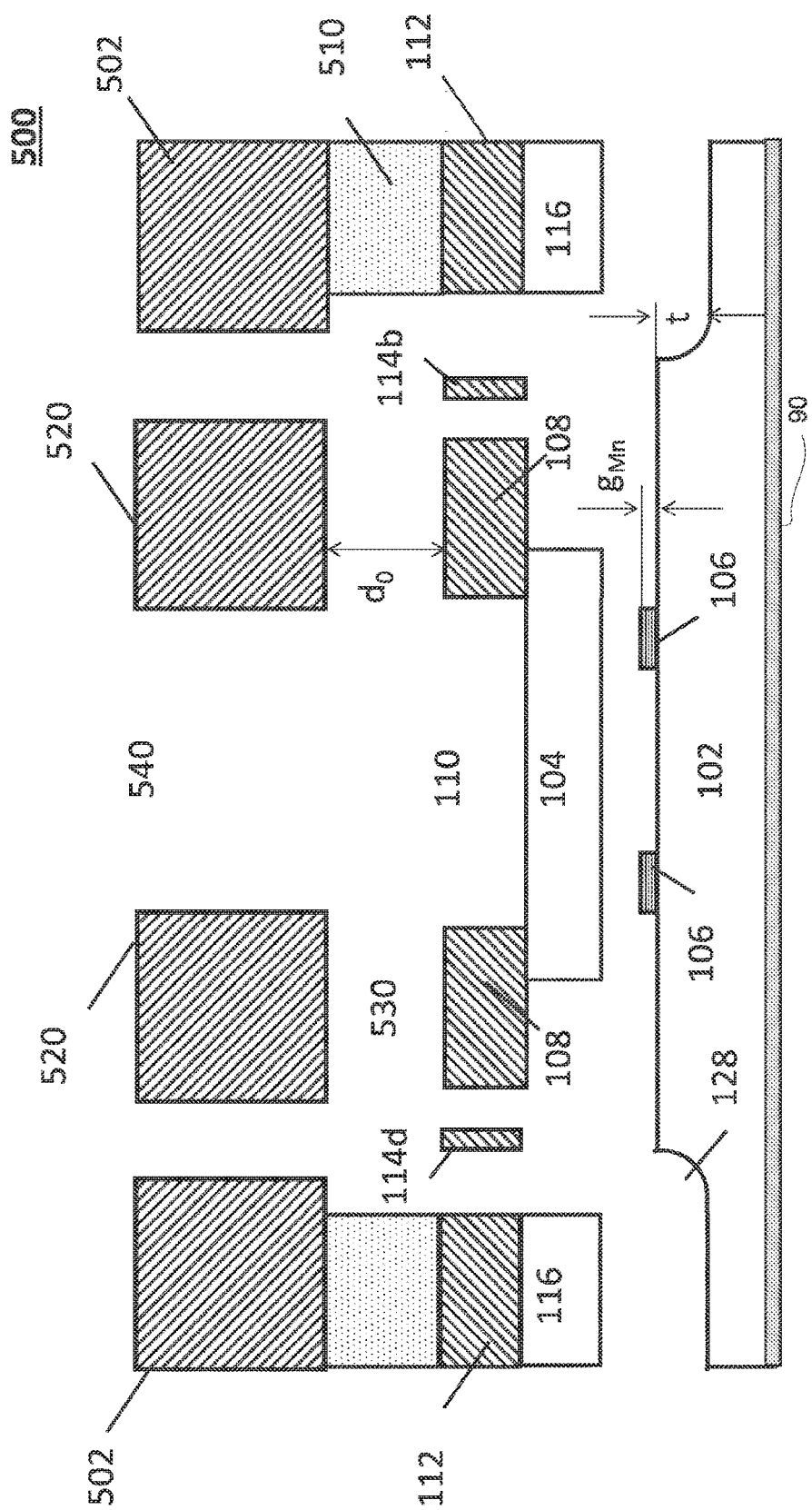
FIG. 15A shows schematically a tunable MEMS etalon device, in a cross-sectional view and in an initial as-fabricated, non-stressed un-actuated state, according to another example of the presently disclosed subject matter.
Figure 15B:
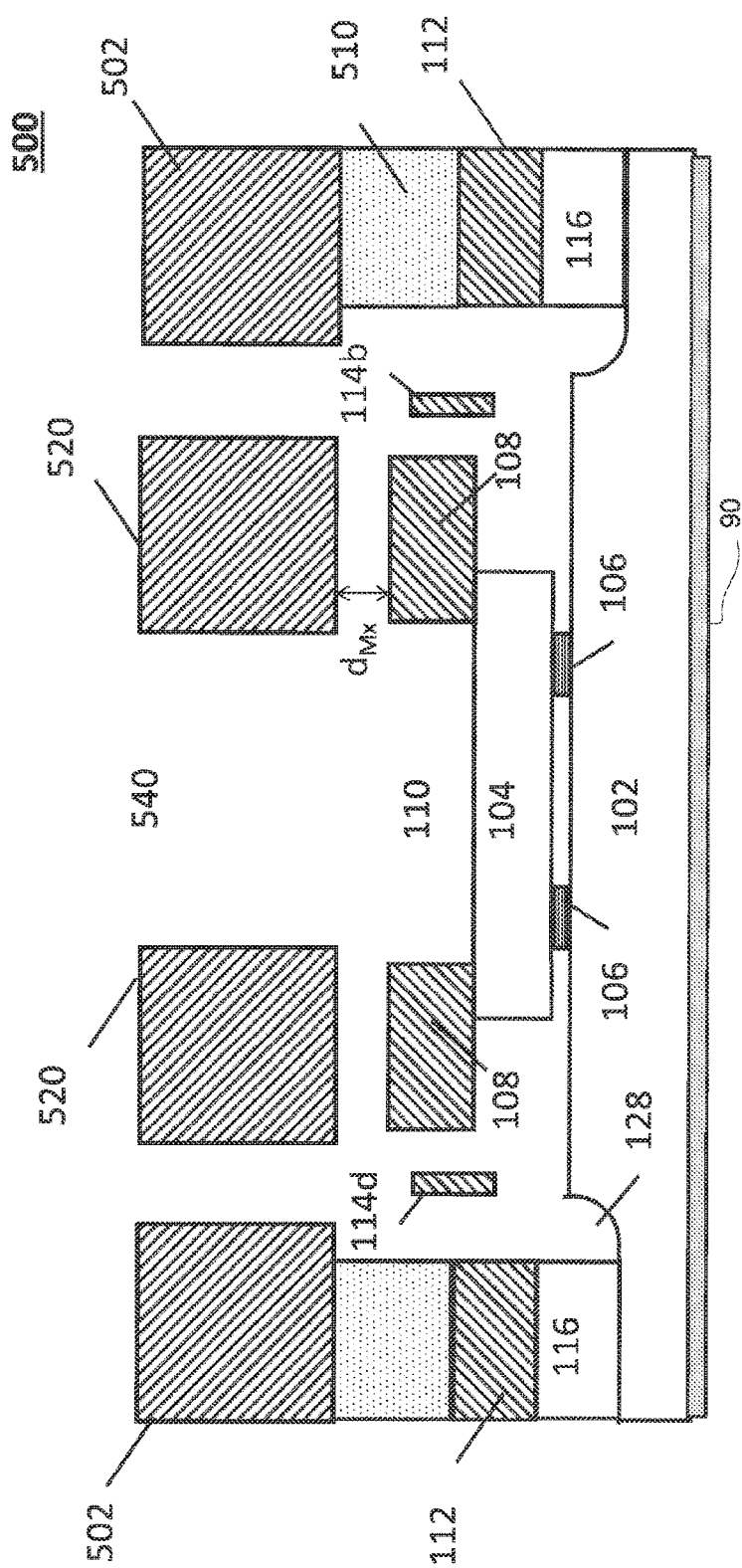
FIG. 15B shows the device of FIG. 15A in an initial pre-stressed un-actuated state, according to an example of the presently disclosed subject matter.
Figure 15C:
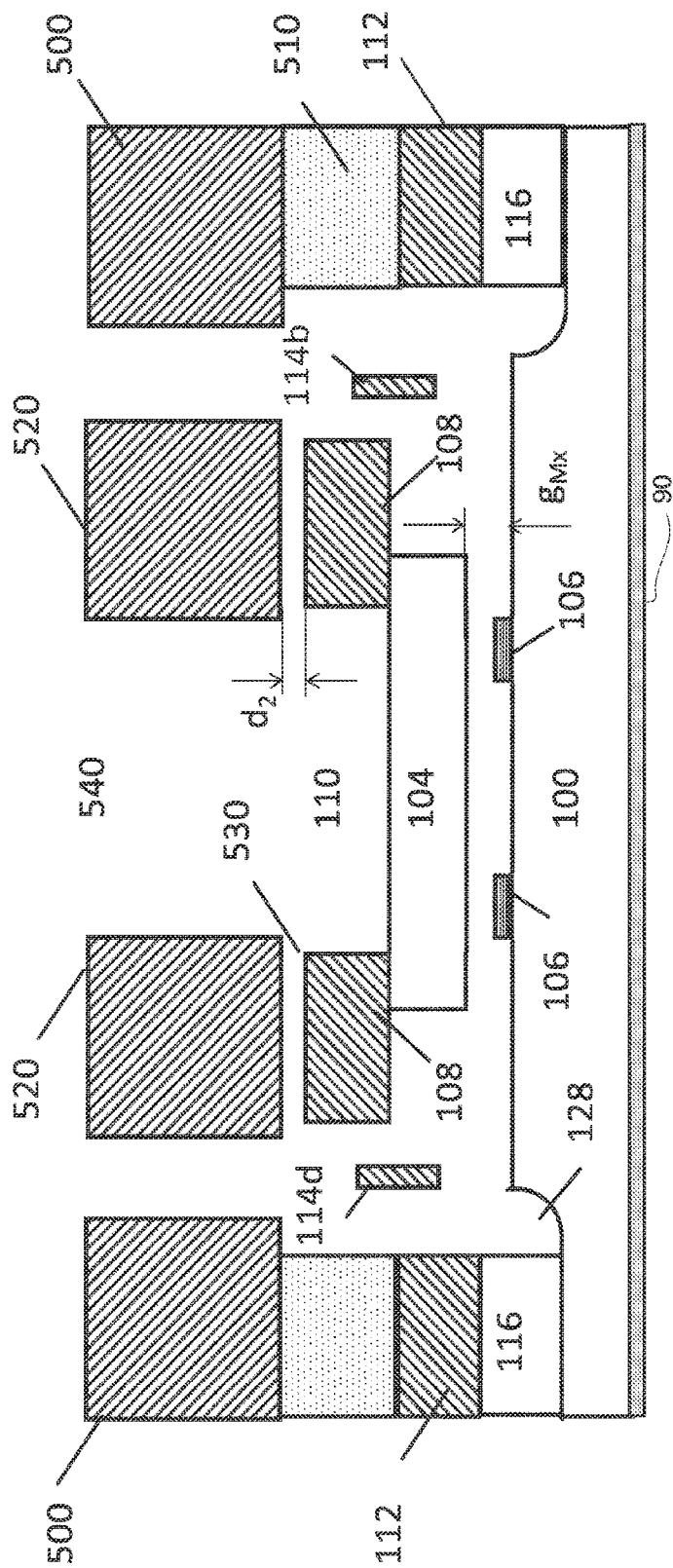
FIG. 15C shows the device of FIG. 15B in an actuated state, according to an example of the presently disclosed subject matter.

FIGS. 15A-15C show schematically, in cross-sectional views, a second example of a tunable MEMS etalon device disclosed herein and numbered 500. FIG. 15A shows device 500 in an as-fabricated (non-stressed) configuration, before the bonding of spacers 116 to the back mirror 102. FIG. 15B shows device 500 in an initial pre-stressed un-actuated state, while FIG. 15C shows device 500 in an actuated state. Device 500 uses a SOI wafer and SOI fabrication technology and is therefore referred to herein a "SOI device", in contrast to GSG device 100. Device 500 has a similar structure to that of device 100 and includes many of its elements (which are therefore numbered the same). Since both SOI wafers and technology are known, the following uses SOI terminology known in the art.

In FIG. 15A, front mirror 104 is not in physical contact with the back stoppers 106 on back mirror 102, while in FIG. 15B, the pre-stress brings front mirror 104 and back stoppers 106 into physical contact. In FIG. 15C, front mirror 104 has moved away from back mirror 102 and is in an intermediate position between the back stoppers 106 and electrodes 520, which, in the SOI device, are made of a handle layer 502 of the SOI wafer. The SOI wafer is used such that the handle layer serves as a substrate, as well as for fabrication of electrodes 520. Frame 108 includes regions that serve as the opposite electrode. An anchor structure (layer) 112 in the device SI layer of the SOI wafer is connected to frame 108 through springs 114a-d. Anchor structure 112 is attached to handle layer 502 through a BOX layer 510. A gap between the SI device and handle layers is indicated by 530. Gap 530 is created by etching the BOX layer 510 under the frame and under the springs. An opening 540 is formed in handle layer 502, exposing front mirror 104 and back mirror 102 to light rays in the −Z direction.

In the as-fabricated state, before the bonding of spacers 116 to the glass plate comprising back mirror 102, gap 530 between the frame and the handle layer has a size do and is equal to the thickness of the BOX layer, as shown in FIG. 15A. After the bonding, gap 530 has a size $d_{Mx}$ equal to the thickness of BOX layer 510 minus the depth t of recess 128 and minus the height of back stoppers 106. Thus, $d_{Mx}$ is smaller than do due to the pre-stress, since when front mirror 104 is in contact with back stoppers 106, the springs are deformed, and the size of released gap 530 decreases. Upon actuation, FIG. 15C, frame 108 pulls front mirror 104 away from back mirror 102, further decreasing the size of gap 530 to $d_2$ and increasing the size of the back gap (at most, up to a maximal size $g_{Mx}$).

Figure 16:
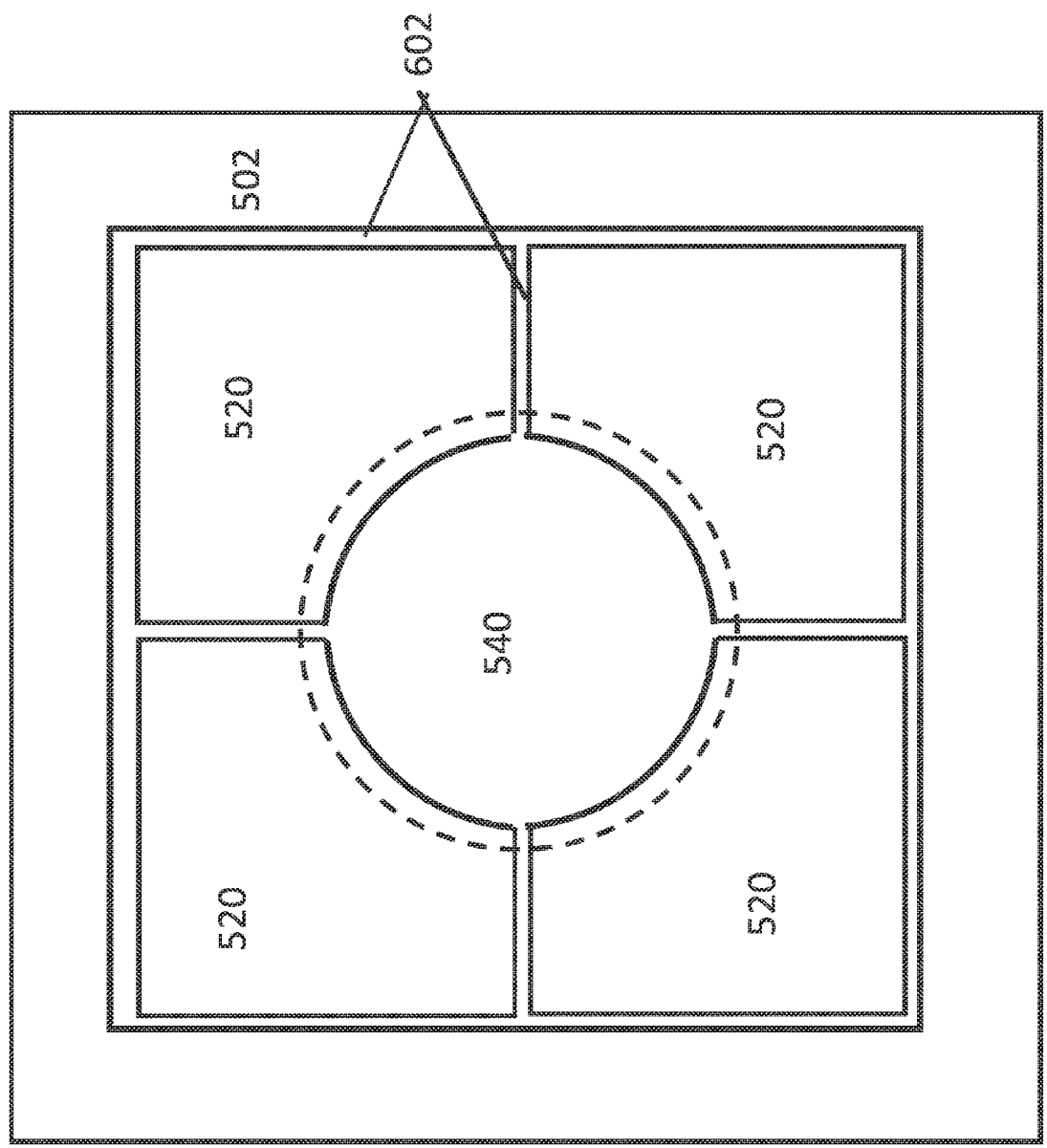
FIG. 16 shows a bottom view of the handle layer of the SOI (Silicon on insulator) wafer in the device of FIG. 15A or 5B, according to an example of the presently disclosed subject matter.

FIG. 16 shows a schematic illustration of a bottom view of the handle layer of the SOI wafer. The figure shows an insulating trench 602 between electrodes 520. In certain examples, one or more regions/electrodes of the handle layer 520 may include two or more regions that are substantially electrically insulated from one another. Accordingly, application of different electric potentials between these two or more regions of handle layer 520 and of frame 108 allows adjusting parallelism between the front mirror and the back mirror. For instance, the two or more regions of the handle lay may include at least three regions, arranged such that parallelism between the front and back mirrors can be adjusted two-dimensionally with respect to two axes.

Figure 17:
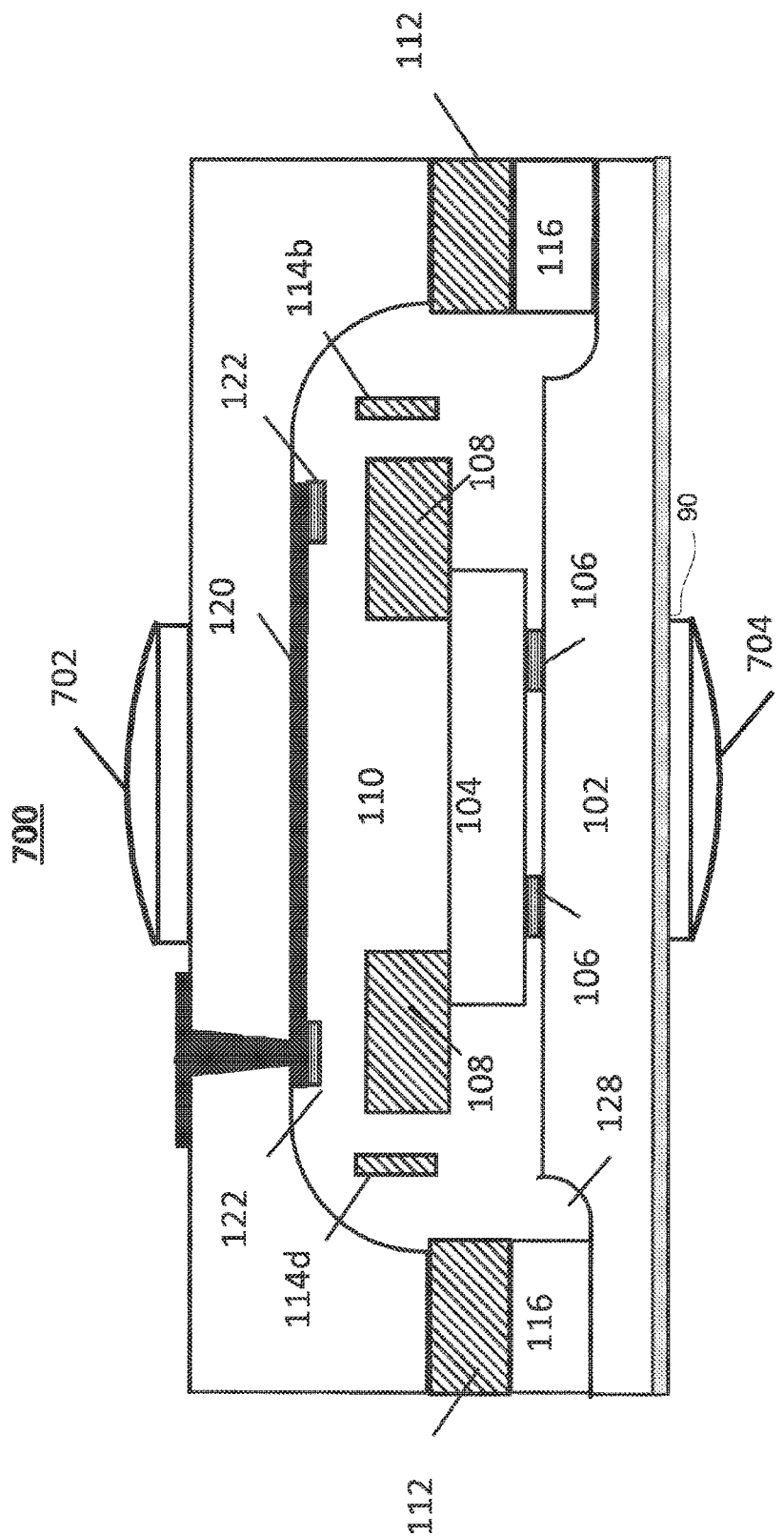
FIG. 17 shows an assembly comprising a device disclosed herein with integrated optics, according to an example of the presently disclosed subject matter.

FIG. 17 shows a schematic illustration of an assembly comprising a device 700 with a lens 702 formed in, on, or attached to the cap, and a lens 704 formed in, on, or attached to the back mirror. This allows integration of optics with the etalon to provide an "optics" tunable etalon device. Also, in case there is an under-pressure inside the cavity between the two glasses, the addition of such lenses improves the stiffness and decreases deformation of the back mirror and of the cap. Other elements are as marked in device 100.

Tunable etalons disclosed herein in devices 100 and 500 may be used for imaging applications. For example, these devices may be designed and used as a wide dynamic filter tunable over a wide spectral band (e.g., extending from infra-red [IR] or near-IR (NIR) wavelengths in the long wavelength side of the spectrum, through the visible (VIS) range down to the violet and/or ultra-violet (UV) wavelengths at the short wavelength side of the spectrum. Additionally or alternatively, such devices may be designed to have a wide spectral transmission profile (e.g., a full width half maximum (FWHM) of the spectral transmission profile of approximately 60-120 nm, which is suitable for image grabbing/Imaging applications) and to also have a relatively large free spectral range (FSR) between successive peaks in the order of, or larger than 30 nm, thereby providing good color separation.

Devices disclosed herein use, for example, electrostatic actuation to tune the spectral transmission and other properties of the etalon. The term "electrostatic" actuation is used to refer to close gap actuation provided by a parallel plate electrostatic force between one or more electrodes on each of two layers of a device. For example, in device 100, the electrostatic actuation is performed by applying voltage between one or more regions of frame 108 and one or more electrodes 120 formed/deposited on the bottom surface of cap 118. In device 500, the electrostatic actuation is performed by applying voltage between one or more regions of frame 108 and one or more regions of handle layer 502. This provides tunability of the displacement between the mirrors and therefore of the etalon.

One of the central challenges of the electrostatic actuation is the presence of so-called pull-in instability, which limits the stable displacement of the approaching electrode (e.g. mounting frame 108 in both device 100 and device 500) towards the static electrode (e.g. electrodes 120 or 520) to one-third of the initial gap between them. Thus, in electrostatic actuation configurations disclosed herein, the initial gap between the handle layer and the mounting frame, or between the electrodes 120 and the mounting frame, is significantly larger (at least 4-5 times) than the required maximal optical gap $g_{Mx}$. Therefore, the gap between the front and back mirrors in the range $g_{Mn}$ to $g_{Mx}$ is in a stable range of the actuator and the pull-in instability is eliminated.

As mentioned above, electrostatic actuation is merely one example of an actuation mechanism used for tuning the gap between the front and back mirrors, which is applicable in MEMS etalon devices as disclosed herein, and should not be construed as limiting. The presently disclosed subject matter further contemplates other types of actuation mechanisms such as piezo-electric actuation and Kelvin force actuation.

Specifically, in some examples, the etalon system includes a piezoelectric actuation structure that is attached to the frame or flexure structures such that application of electric voltage enables actuation of the frame structure (and thereby causes movement of the front mirror) away from the back mirror. In some examples, upon actuation, frame 108 pulls front mirror 104 away from back mirror 102, thereby increasing the size of gap between them, and thus increasing the size of the back gap. By placing several piezoelectric actuation structures on different parts/flexures/springs of the frame, the parallelism between the aperture mirror and the back mirror of the etalon can be controlled. Application WO 2017/009850 to the Applicant, which is incorporated herein by reference in its in entirety, describes examples of implementations of piezoelectric and Kelvin force actuation; see for example in FIGS. 8a to 8c and FIGS. 9a and 9b.

Figure 18:
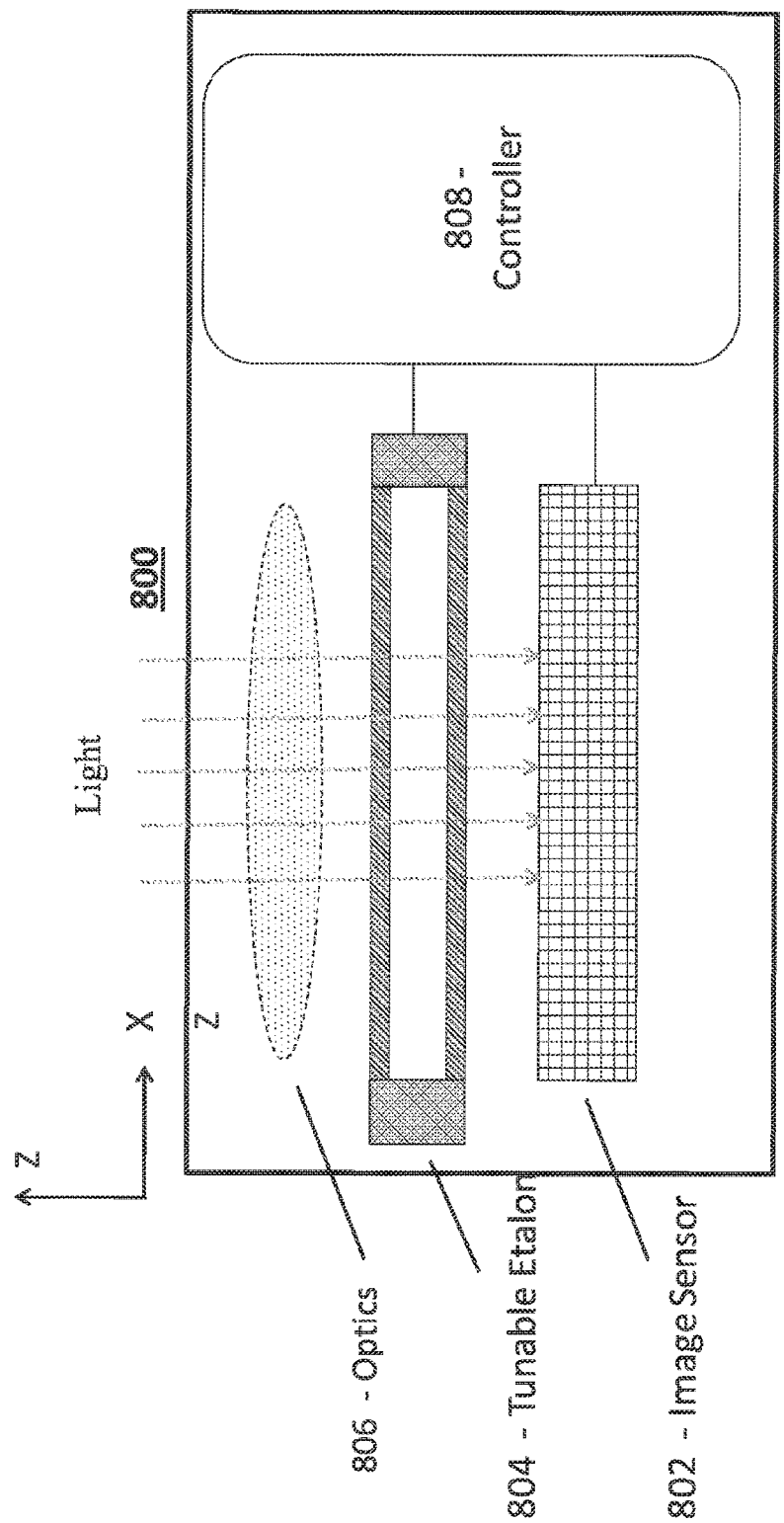
FIG. 18 illustrates schematically, in a block diagram, a sequential imaging system configured according to an example of the presently disclosed subject matter.

Reference is now made to FIG. 18 which illustrates schematically, in a block diagram, a sequential imaging system 800 configured according to an embodiment disclosed herein.

System 800 includes an image sensor 802 (for example a multi-pixel sensor) and a tunable MEMS etalon device 804 configured according to the present invention as described above. Tunable MEMS etalon device 804 serves as tunable spectral filter and is placed in the general optical path of light propagation towards sensor 802 (e.g., Intersecting the Z axis in the figure). Optionally, optics 806 (e.g. Imaging lens(es)) are also arranged in the optical path of the sensor 802.

Color Image acquisition can be carried out by the device 800 in a similar way as described for example in patent application publication WO 2014/207742, which is assigned to the assignee of the present application, and which is incorporated herein by reference. Tunable MEMS etalon device 804, when used in imaging system 800, is configured to provide a spectral filtering profile suitable for sequential color imaging with high color fidelity.

More specifically, according to various examples disclosed herein, the materials of the back mirror 102 and front mirror 108 of the etalon and the tunable back gap size, are configured such that the spectral filtration profile of the etalon is tunable in the spectral ranges in the visible and possibly also in the IR/near-IR ranges, which are suitable for imaging of color images (for example with colors corresponding to the RGB space or to a hyper spectral color space). Also, the front and back mirrors and the tunable back gap size may be configured such that the transmission profile properties (Including for example, FWHM and FSM) of the etalon are also suitable for sequential color imaging. For instance, the materials of the front and back mirrors and the tunable back gap size may be selected such that the FWHM of the spectral transmission profile of the etalon is sufficiently wide to match the FWHM of the colors in the conventional RGB space, and also that the FSR between successive transmission peaks in the spectral transmission profile is sufficiently large to avoid color mixing (to avoid simultaneous transmission to the sensor of different colors/spectral-regimes to which the sensor is sensitive). Further, the etalon may be relatively laterally wide (relative to the back gap size), such that it is wide enough to interpose in the optical path between optics 806 and all the pixels of the sensor 802, and, on the other hand, the gap between its mirrors is small enough to provide the desired spectral transmission properties and the tunability of the etalon.

System 800 may also include a control circuitry (controller) 808 operatively connected to the image sensor 802 and to the tunable MEMS etalon device 804 and configured and operable to tune the filter and to capture image data. For example, the capture of colored image data may include sequential acquisition of monochromatic frames corresponding to different colors (different spectral profiles) from the sensor. For example, controller 808 may be adapted for creating/capturing colored image data by sequentially operating tunable MEMS etalon device 804 for sequentially filtering light incident thereon with three or more different spectral filtering curves/profiles, and operating sensor 802 for acquiring three or more images (monochromatic images/frames) of the light filtered by the three or more spectral curves respectively. Tunable spectral filter (etalon device) 804 is operated to maintain each of the spectral filtering curves for corresponding time slot durations, during which sensor 802 is operated for capturing the respective monochrome images with respective integration times fitting in these time slots. Accordingly, each of the captured monochrome images corresponds to light filtered by a different respective spectral filtering curve and captured by sensor 802 over a predetermined integration time. The control circuitry (e.g., controller) can be further configured to receive and process readout data indicative of the three or more monochrome images from the sensor, and generate data indicative of a colored image (namely an image including Information on the intensities of at least three colors in each pixel of the image).

The terms "controller" as used herein might be expansively construed to include any kind of electronic device with data processing circuitry, which includes a computer processor (Including, for example, one or more of central processing unit (CPU), a microprocessor, an electronic circuit, an integrated circuit (IC), firmware written for or ported to a specific processor such as digital signal processor (DSP), a microcontroller, a field programmable gate array (FPGA), an application specific integrated circuit (ASIC), etc.) adapted for executing instructions, stored for example on a computer memory operatively connected to the controller, as disclosed herein below.

Any of the mentioned optical devices may be manufactured in various manners. Non-limiting examples of one or more manufacturing processes are illustrated in PCT patent application PCT/IB2017/57261 which is incorporated herein by reference.

Figure 19A:
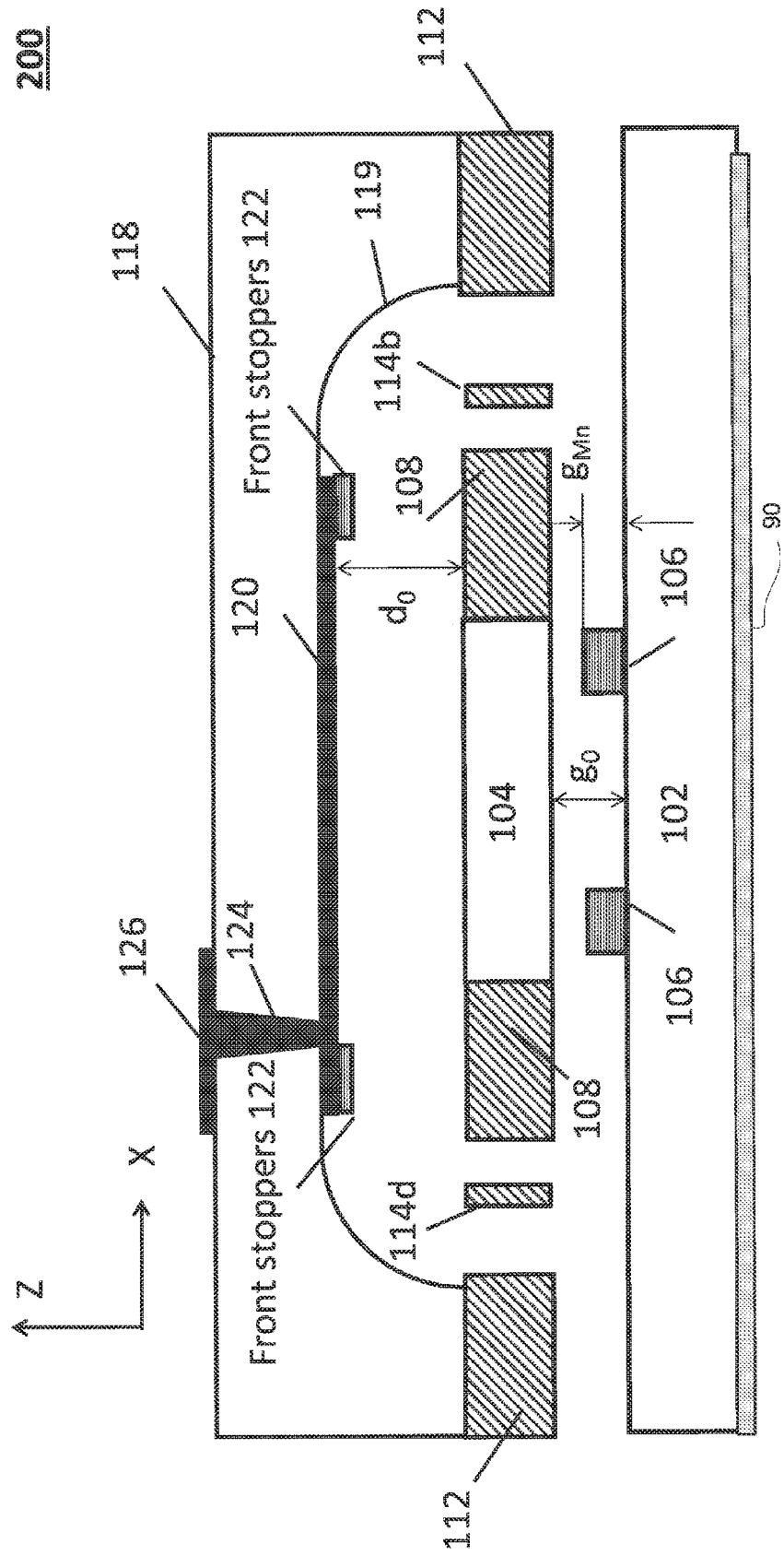
FIG. 19A shows schematically a tunable MEMS etalon device, in a cross-sectional view and in an initial as-fabricated, non-stressed un-actuated state, according to another example of the presently disclosed subject matter.
Figure 19B:
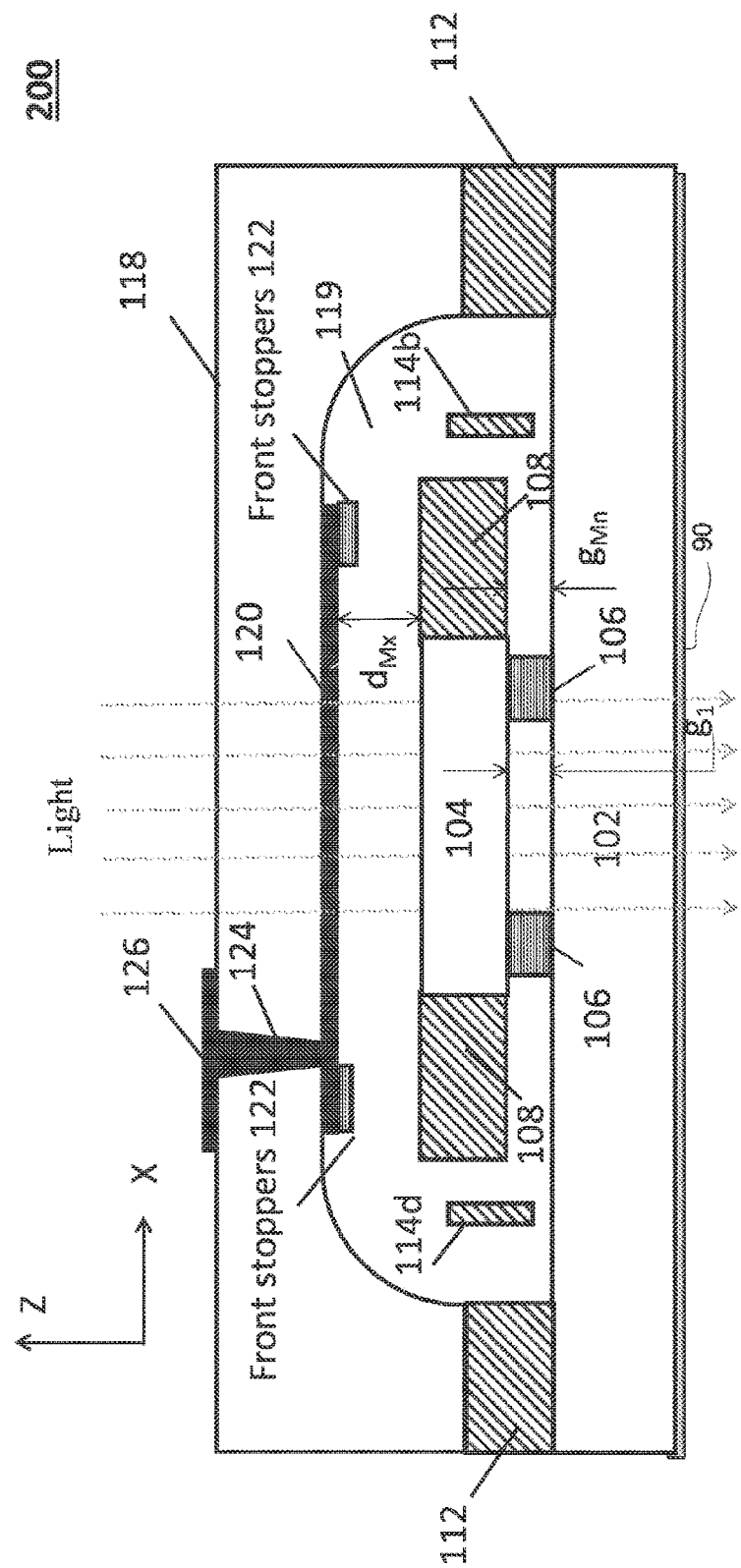
FIG. 19B shows the device of FIG. 19A in an initial pre-stressed un-actuated state, according to an example of the presently disclosed subject matter.
Figure 19C:
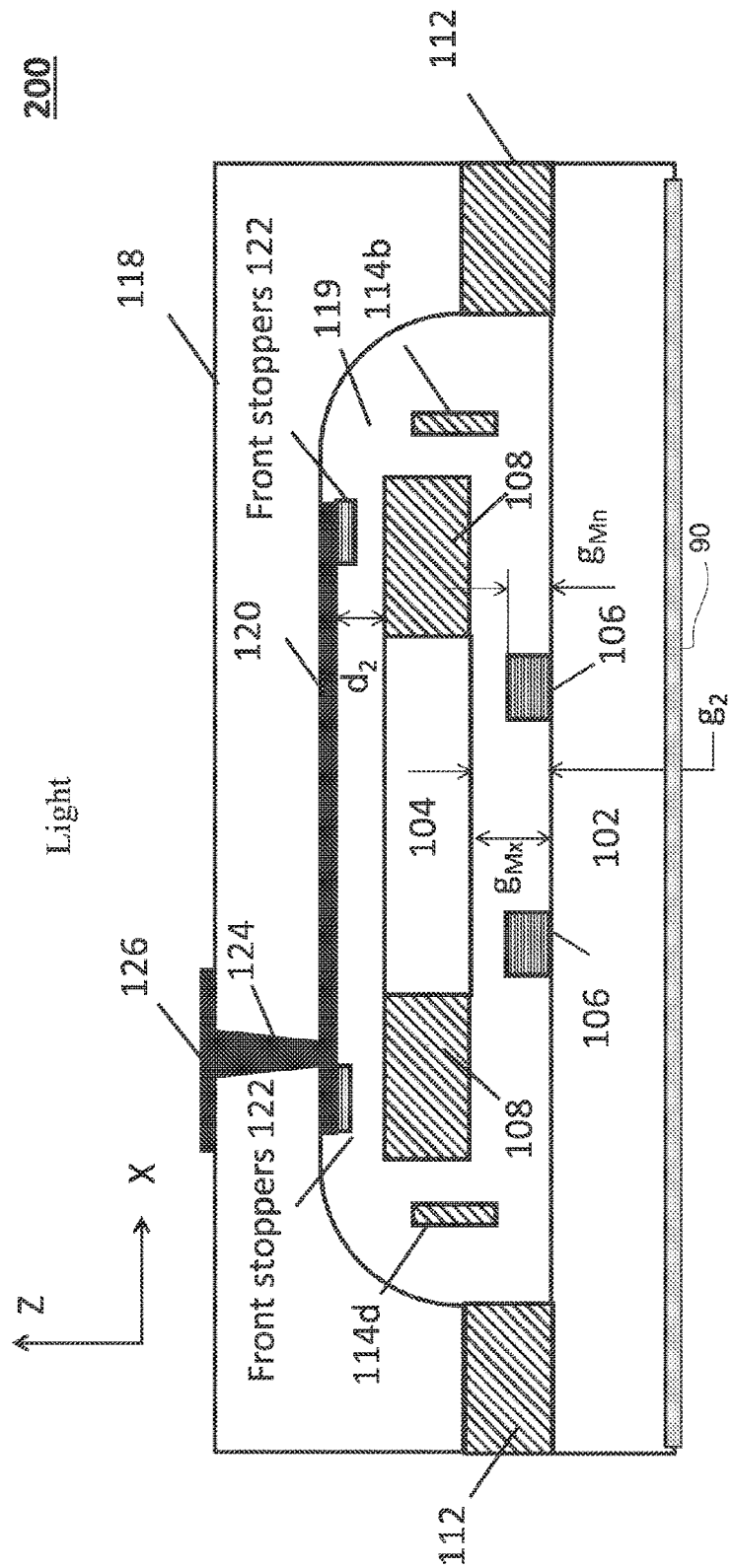
FIG. 19C shows the device of FIG. 19B in an actuated state, according to an example of the presently disclosed subject matter.

FIGS. 19A-19C show schematically, in cross-sectional views, a third example of a tunable MEMS etalon device disclosed herein and numbered 200.

FIG. 19A shows device 200 in an as-fabricated (non-stressed) configuration, before the bonding of anchor structure 112 to the back mirror 102. FIG. 19B shows device 200 in an initial pre-stressed un-actuated state, while FIG. 19C shows device 200 in an actuated state. Device 200 has a similar structure to that of device 100 and includes many of its elements (which are therefore numbered the same).

In some examples, front mirror 104 is formed in a hybrid layer in which the front mirror is made of a transparent or semi-transparent material (to light wavelengths in a desired range transmitted by the tunable etalon filter), and the anchor 112, flexure 114, and frame 108 structures are made of a relatively stiffer material. As shown in FIGS. 19A-19C front mirror is fabricated in alignment (e.g., from a single wafer) with frame 108, rather than being attached thereto from one side. In some examples, front mirror is made of any one of the following materials: glass, plastic, or germanium, while the anchor 112, flexure 114, and frame 108 structures are made of silicon. It is noted that this list of materials is not exhaustive and should not be construed as limiting.

In FIG. 19A, front mirror 104 is not in physical contact with the back stoppers 106 on back mirror 102, while in FIG. 19B, the pre-stress brings front mirror 104 and back stoppers 106 into physical contact. In FIG. 19C, front mirror 104 has moved away from back mirror 102, due to actuation, and is in an intermediate position between the back stoppers 106 and electrodes 120.

In the as-fabricated state, front mirror 104 does not touch back stoppers 106. FIG. 19B shows the device of FIG. 19A in an initial pre-stressed un-actuated state, with front mirror 104 physically touching back stoppers 106. The physical contact is induced by stress applied on the frame through the springs when anchor structure 112 is forced into contact with the glass wafer substrate (which includes back mirror 102) for eutectic bonding to the glass plate of back mirror 102; see FIG. 9(c) below. Notably, height difference between back stoppers 106 and anchors assists in attaining the required stress. Thus, the configuration shown in FIG. 19B is said to be "pre-stressed".

FIG. 19C shows the device in an actuated state, with front mirror 104 in an intermediate position between back stoppers 106 and front stoppers 122, moved away from back mirror 102.

In some examples, actuation is achieved by applying a voltage V between the one or more regulons/electrodes 120 of the actuation substrate serving as an actuating electrode and the one or more regions frame 108.

As mentioned above, in some examples, the combined value of the maximal required travel distance (maximal back gap size) $g_{Mx}$ Is smaller than one third of an as-fabricated ("electrostatic") gap size do of a gap between electrodes 120 and frame 108 (FIG. 19A), to provide stable controllable electrostatic operation of the frame by the electrodes located on the cap. In certain examples, the as-fabricated electrostatic gap $d_0$ may have a value of about 1-4ˆm. The requirement for stable operation is $g_{Mx} < d_0/3$, since the stable travel distance of a capacitive actuator is ⅓ of the as-fabricated electrostatic gap, i.e., Is $d_0/3$.

Note that, in certain examples, an un-actuated state may include a configuration in which movable mirror 104 is suspended, and does not touch either back stoppers 106 or front stoppers 122.

According to some examples, device 200 is fully transparent. It includes a transparent back 5 mirror (102), a transparent front mirror (104) and a transparent cap (118), as well as transparent anchor 112, flexure 114, and frame 108 structures. One advantage of the full transparency is that the device can be observed optically from two sides. Another advantage is that this architecture may be useful for many other optical devices incorporating movable mechanical/optical elements, such as mirrors, diffractive gratings, or lenses.

All patents and patent applications mentioned in this application are hereby incorporated by reference in their entirety for all purposes set forth herein. It is emphasized that citation or identification of any reference in this application shall not be construed as an admission that such a reference is available or admitted as prior art.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

The various features and steps discussed above, as well as other known equivalents for each such feature or step, can be mixed and matched by one of ordinary skill in this art, to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element It Is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately, or in any suitable sub-combination, or as suitable in any other described embodiment of the invention. Certain features described in the context of various embodiments are not to be considered essential features of those embodiments, unless the embodiment is inoperative without those elements.

All patents and patent applications mentioned in this application are hereby incorporated by reference in their entirety for al purposes set forth herein. It is emphasized that citation or identification of any reference in this application shall not be construed as an admission that such a reference is available or admitted as prior art.

The terms "Including", "comprising", "having", "consisting" and "consisting essentially of" are used in an interchangeable manner. For example, any method may include at least the steps included in the figures and/or in the specification, only the steps included in the figures and/or the specification. The same applies to the spectral imager and the mobile computer.

It will be appreciated that for simplicity and clarity of illustration, elements shown in the figures have not necessarily been drawn to scale. For example, the dimensions of some of the elements may be exaggerated relative to other elements, for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front" "back," "top," "bottom," "over," "under" and the like in the description and in the claims, if any, are used for descriptive purposes and not necessarily for describing permanent relative positions. It is understood that the terms so used are interchangeable under appropriate circumstances, such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality can be seen as "associated with" each other, such that the desired functionality is achieved, irrespective of architectures or intermedial components. Likewise, any two components so associated can also be viewed as being "operably connected," or "operably coupled," to each other to achieve the desired functionality. Furthermore, those skilled in the art will recognize that boundaries between the above-described operations are merely illustrative. The multiple operations may be combined into a single operation, a single operation may be distributed in additional operations, and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative, rather than in a restrictive, sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one as, or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

While this disclosure has been described in terms of certain embodiments and generally associated methods, alterations and permutations of the embodiments and methods will be apparent to those sidled in the art. The disclosure is to be understood as not limited by the specific embodiments described herein, but only by the scope of the appended claims.

What is claimed is:

1. A Microelectromechanical Systems (MEMS) tunable filter comprising: a lens and a frame that is configured to support the lens; a front mirror and a back mirror having a tunable gap disposed therebetween and at least one actuation electrode configured to tune the gap and obtain a desired transmission profile, wherein the frame is part of the at least one actuation electrode;
wherein the lens has a coefficient of thermal expansion (CTE) of a first value and the frame has a CTE of a second value different than the first value; wherein the frame and the lens are formed from an etched silicon-on-glass wafer and comprises multiple grooves that form a flexible interface that compensates for differences between thermal expansions of the lens and of the frame, and wherein the dimensions of the grooves are such that they reduce bow of the lens resulting from thermal mismatch between the frame and the lens, while limiting reduction in actuation area of the actuation electrode.

2. The MEMS tunable filter according to claim 1 wherein at least some of the multiple grooves are formed in an overlap area between the lens and the frame.

3. The MEMS tunable filter according to claim 1, wherein at least some of the multiple grooves are formed outside of an overlap region between the lens and the frame.

4. The MEMS tunable filter according to claim 1 wherein at least some of the multiple grooves include any one of the following: radial grooves, co-axial circular grooves, curved grooves, curved grooves that extend from an interior space defined by the frame.

5. The MEMS tunable filter according to claim 1 wherein at least some of the multiple grooves comprise a line and at least one additional through-hole.

6. The MEMS tunable filter according to claim 1 wherein at least some of the multiple grooves differ from each other by at least one out of shape and size.

7. The MEMS tunable filter according to claim 1 wherein at least some of the multiple grooves are arranged in one of the following arrangements:
a radially symmetrical manner around an interior space defined by the frame; and a radially asymmetrical manner around an interior space defined by the frame.

8. The MEMS tunable filter according to claim 1 wherein at least one groove of the multiple grooves at least one of: variable width; and fixed width.

9. The MEMS tunable filter according to claim 1 wherein the lens comprises multiple grooves that form the flexible interface.

10. The MEMS tunable filter according to claim 1 wherein the lens comprises a first plurality of grooves; wherein the frame comprises a second plurality of grooves; and wherein the first plurality of grooves and the second plurality of grooves form the flexible interface.

11. The MEMS tunable filter according to claim 1 wherein at least one portion of the lens and at least one portion of the frame are positioned at a same plane.

12. The MEMS tunable filter according to claim 1 wherein at least one portion of the lens and at least one portion of the frame are positioned at different planes.

13. The MEMS tunable filter according to claim 1 wherein the lens does not extend outside an interior space defined by the frame.

14. The MEMS tunable filter according to claim 1 wherein the lens extends outside of an interior space defined by the frame.

15. The MEMS tunable filter according to claim 1 wherein the frame is configured to move in response to an actuation.

16. The MEMS tunable filter according to claim 1 further comprising a flexure; wherein the frame is mechanically coupled to the flexure.

17. The MEMS tunable filter according to claim 1 wherein the frame comprises one or more flexures.

18. The MEMS tunable filter according to claim 1 wherein the frame comprises multiple flexures and at least some of the multiple flexures comprise linear grooves or curved grooves.

19. The MEMS tunable filter according to claim 1 comprising an additional lens; wherein the lens and the additional lens are movable in relation to each other.

20. The MEMS tunable filter according to claim 1 is an optical unit filter.

21. The MEMS tunable filter according to claim 1 is a Fabri-Perot tunable filter.

22. The MEMS tunable filter according to claim 1 wherein the lens is positioned on and contacts a certain region of the frame, and wherein the certain region of the frame is supported by a simple support or by a fixed support by another component of the optical unit.

23. The MEMS tunable filter according to claim 1 wherein the lens is positioned on and contacts a certain region of the frame, and wherein the frame prevents the lens from bending.

24. The MEMS tunable filter according to claim 23 wherein the frame allows the lens to freely expand in plane.

25. The MEMS tunable filter of claim 1, wherein at least one dimension of the grooves is characterized by microscopic dimension.

26. The MEMS tunable filter of claim 1, wherein a surface of the frame is attached to the surface of the lens and where the multiple grooves are extended along the surface of the frame.

27. The MEMS tunable filter of claim 26, wherein a longest dimension of the grooves is orientated parallel to top surface of the frame.

* * * * *